United States Patent
Hibino et al.

(10) Patent No.: US 11,245,805 B2
(45) Date of Patent: Feb. 8, 2022

(54) IMAGE FORMING SYSTEM, METHOD FOR CONTROLLING POWER SUPPLY, AND COMPUTER-READABLE RECORDING MEDIUM

(71) Applicant: KONICA MINOLTA, INC., Tokyo (JP)

(72) Inventors: Takeshi Hibino, Toyokawa (JP); Taketoshi Yamahata, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/843,955

(22) Filed: Apr. 9, 2020

(65) Prior Publication Data

US 2020/0374414 A1  Nov. 26, 2020

(30) Foreign Application Priority Data

May 22, 2019  (JP) .............................. JP2019-095929

(51) Int. Cl.
  *H04N 1/00*   (2006.01)
(52) U.S. Cl.
  CPC ..... *H04N 1/00639* (2013.01); *H04N 1/00602* (2013.01); *H04N 1/00896* (2013.01); *H04N 1/00904* (2013.01)
(58) Field of Classification Search
  None
  See application file for complete search history.

(56) References Cited

U.S. PATENT DOCUMENTS

| 9,162,844 B2 | 10/2015 | Kakutani et al. |
| 9,933,737 B1* | 4/2018 | Miyamae ............... G03G 15/80 |
| 2006/0231736 A1* | 10/2006 | Matsuda ............ H04N 1/32101 250/208.1 |
| 2020/0252516 A1* | 8/2020 | Kadobayashi ..... H04N 1/00896 |

FOREIGN PATENT DOCUMENTS

| JP | H06133116 A | 5/1994 |
| JP | H10290309 A | 10/1998 |
| JP | 2010265109 A | 11/2010 |
| JP | 2014162590 A | 9/2014 |
| JP | 2017212485 A | 11/2017 |

OTHER PUBLICATIONS

RD 467100 A (Abstract), anonymous. (Year: 2003).*

* cited by examiner

*Primary Examiner* — Thomas D Lee
(74) *Attorney, Agent, or Firm* — Holtz, Holtz & Volek PC

(57) ABSTRACT

An image forming system includes an image forming apparatus having an image reading device, and a post-processing apparatus having a manual staple mechanism. The manual staple mechanism is capable of performing staple processing on condition that power is supplied from the image forming apparatus to the post-processing apparatus. The image forming apparatus stops power supply to the post-processing apparatus on condition that a predetermined time has elapsed since reference timing. When the image forming apparatus reads an original with the image reading device, the image forming apparatus determines presence or absence of a staple mark in the original based on a read result. When the image forming apparatus determines that the staple mark is present, the image forming apparatus extends the predetermined time.

20 Claims, 24 Drawing Sheets

1000

IMAGE FORMING SYSTEM, METHOD FOR CONTROLLING POWER SUPPLY, AND COMPUTER-READABLE RECORDING MEDIUM

The entire disclosure of Japanese Patent Application No. 2019-095929, filed on May 22, 2019, is incorporated herein by reference in its entirety.

BACKGROUND

Technological Field

The present disclosure relates to an image forming system, a method for controlling power supply, and a computer-readable recording medium capable of performing manual staple processing.

Description of the Related Art

Conventionally, image forming apparatuses such as a printer, a copying machine, a facsimile, and a multi-functional peripheral thereof have been known. To such an image forming apparatus, a post-processing apparatus can be connected, which performs staple processing and the like on sheets subjected to image formation.

There are two types of staple processing: one is auto staple processing that automatically staples a plurality of ejected sheets in the post-processing apparatus when a user provides an instruction beforehand, and the other is manual staple processing that staples a plurality of sheets in the post-processing apparatus by a user operation (i.e., staple processing by a manual staple mechanism).

When manual staple processing is performed, the user sets a plurality of sheets in a bundle at a predetermined sheet insertion opening of the post-processing apparatus. Then, the user inputs an instruction to perform staple processing into the image forming apparatus, and thereby stapling is performed on the plurality of sheets. In manual staple processing, it is necessary that power is supplied to the post-processing apparatus.

Japanese Laid-Open Patent Publication No. 2014-162590 discloses a "configuration in which, if a bundle of sheets is inserted into an insertion opening for manual stapling when an image forming apparatus is in a sleep mode, only a post-processing apparatus for performing staple processing returns from the sleep mode while the image forming apparatus remains in the sleep mode". Thereby, the post-processing apparatus in Japanese Laid-Open Patent Publication No. 2014-162590 can perform staple processing. By such processing, Japanese Laid-Open Patent Publication No. 2014-162590 achieves reductions in waiting time and power consumption when manual stapling is performed.

In addition, Japanese Laid-Open Patent Publications Nos. 2010-265109, 10-290309, 6-133116, and 2017-212485 disclose a configuration of detecting a staple mark (a staple hole, a staple position).

SUMMARY

When a shift time to be taken until a sleep mode starts is set to be short to suppress power consumption in an image forming apparatus, the following problem may occur. For example, it is assumed that the user removes a staple needle from stapled originals, performs a job (for example, copy), and tries to manually staple the aligned originals after completion of the job. In this case, there may occur a situation where "a manual staple mechanism cannot be used because the image forming apparatus already enters the sleep mode (a sleep state, a power saving mode)".

In addition, even in the configuration in Japanese Laid-Open Patent Publication No. 2014-162590, it is necessary to wait for the post-processing apparatus to return from the sleep mode, and thus there may occur a situation where the user cannot use a manual staple mechanism immediately.

As described above, conventionally, the user has to wait for the image forming apparatus or the post-processing apparatus to return from the sleep mode. Thus, the user has to wait for manual staple processing to become ready. On the other hand, when the shift time to be taken until the sleep mode starts is set to be long, the amount of power consumption increases.

The present disclosure has been made in view of the aforementioned problem, and an object thereof is to provide an image forming system, a method for controlling power supply, and a computer-readable recording medium that suppress an increase in the amount of power consumption and can promptly perform manual staple processing.

To achieve at least one of the abovementioned objects, according to an aspect of the present disclosure, an image forming system reflecting one aspect of the present disclosure comprises an image forming apparatus having an image reading device, and a post-processing apparatus having a manual staple mechanism. The manual staple mechanism is capable of performing staple processing on condition that power is supplied from the image forming apparatus to the post-processing apparatus. The image forming apparatus stops power supply to the post-processing apparatus on condition that a predetermined time has elapsed since reference timing. When the image forming apparatus reads an original with the image reading device, the image forming apparatus determines presence or absence of a staple mark in the original based on a read result. When the image forming apparatus determines that the staple mark is present, the image forming apparatus extends the predetermined time.

Preferably, when the predetermined time has elapsed since the reference timing, the image forming apparatus stops power supply to the post-processing apparatus by shifting a state of the image forming apparatus from a standby state to a sleep state.

Preferably, when a plurality of originals are continuously read with the image reading device, the image forming apparatus performs a determination of whether or not the staple mark is present, on only a first original of the plurality of originals.

Preferably, when a plurality of originals are continuously read with the image reading device, the image forming apparatus determines whether or not positions of the staple marks in the originals match. The image forming apparatus extends the predetermined time on condition that the positions of the staple marks match.

Preferably, when a plurality of originals are continuously read with the image reading device, the image forming apparatus determines whether or not positions of the staple marks in the originals match. The image forming apparatus extends the predetermined time on condition that the positions of the staple marks in a predetermined number or more of originals of the plurality of originals match.

Preferably, when a plurality of originals are continuously read with the image reading device, the image forming apparatus determines whether or not positions of the staple marks in the originals match. The image forming apparatus extends the predetermined time on condition that the positions of the staple marks in a predetermined percentage or more of originals of the plurality of originals match.

Preferably, the image forming apparatus reads a front side and a back side of the original with the image reading device. The image forming apparatus extends the predetermined time on condition that the staple mark is present on at least one of the front side and the back side.

Preferably, the image forming apparatus reads a front side and a back side of the original with the image reading device. The image forming apparatus extends the predetermined time on conditions that the staple marks are present on the front side and the back side, and a position of the staple mark on the front side and a position of the staple mark on the back side have a corresponding positional relation.

Preferably, when a plurality of originals are continuously read with the image reading device, an original to be used to determine the presence or absence of the staple mark is predetermined. The image forming apparatus can set a reading resolution to be used when reading the plurality of originals. The image forming apparatus reads only the predetermined original of the plurality of originals with a reading resolution higher than the set reading resolution.

Preferably, the image forming apparatus reads the predetermined original with a maximum reading resolution of the image forming apparatus.

Preferably, the predetermined original is a first original of the plurality of originals.

Preferably, the image forming apparatus has an automatic original feeding device. When a setting that causes the automatic original feeding device to read a plurality of originals in a plurality of reading batches is selected, the image forming apparatus determines the presence or absence of the staple marks in each of the reading batches.

Preferably, when the image forming apparatus determines that the staple marks are present in at least one reading batch of the plurality of reading batches, the image forming apparatus extends the predetermined time.

Preferably, when only one original is read with the image reading device, the image forming apparatus does not extend the predetermined time, even though the image forming apparatus determines that the staple mark is present in the original.

Preferably, the image forming apparatus receives an input for setting the predetermined time. When the predetermined time is longer than a predetermined threshold value, the image forming apparatus does not extend the predetermined time, even though the image forming apparatus determines that the staple mark is present.

Preferably, the image forming apparatus further receives an input for setting the threshold value.

Preferably, the image forming apparatus stores a plurality of data that are each used to determine the presence or absence of the staple mark. The image forming apparatus determines the presence or absence of the staple mark on condition that the read result matches or is similar to at least one data of the plurality of data.

Preferably, the image forming apparatus determines that the staple mark is present based on the read result, on conditions that two black dots are present at an end portion of the original including a corner area of the original, and a distance between the two black dots is within a predetermined range.

Preferably, the reference timing is timing at which a job ends.

Preferably, the reference timing is timing at which reading of the original ends.

Preferably, the image forming apparatus further has an operation panel capable of displaying an operation situation of the image forming apparatus. The reference timing is timing at which display of the operation panel shifts from an image indicating that reading of the original is performed to another image.

Preferably, the image forming apparatus detects whether or not the read original is present on a platen glass or in an ejection tray of an automatic original feeding device. The reference timing is timing at which the image forming apparatus detects that the read original is not present on the platen glass or in the ejection tray of the automatic original feeding device.

Preferably, when the image forming apparatus determines that the staple mark is present, the image forming apparatus extends the predetermined time from a first time to a second time longer than the first time. When the predetermined time is extended, and manual stapling is performed by the manual staple mechanism after a lapse of the first time and before a lapse of the second time, the image forming apparatus stops power supply to the post-processing apparatus without waiting for the lapse of the second time.

According to another aspect of the present disclosure, provided is a method for controlling power supply from an image forming apparatus to a post-processing apparatus having a manual staple mechanism. The manual staple mechanism is capable of performing staple processing on condition that power is supplied from the image forming apparatus to the post-processing apparatus. The method for controlling power supply comprises: stopping, by the image forming apparatus, power supply to the post-processing apparatus on condition that a predetermined time has elapsed since reference timing; when the image forming apparatus reads an original, determining, by the image forming apparatus, presence or absence of a staple mark in the original based on a read result; and when the image forming apparatus determines that the staple mark is present, extending, by the image forming apparatus, the predetermined time.

According to still another aspect of the present disclosure, a computer-readable recording medium stores a program for controlling an image forming apparatus that supplies power to a post-processing apparatus having a manual staple mechanism. The manual staple mechanism is capable of performing staple processing on condition that power is supplied from the image forming apparatus to the post-processing apparatus. The program causes a processor of the image forming apparatus to: stop power supply to the post-processing apparatus on condition that a predetermined time has elapsed since reference timing; when an original is read by the image forming apparatus, determine presence or absence of a staple mark in the original based on a read result; and when it is determined that the staple mark is present, extend the predetermined time.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Figure 1:
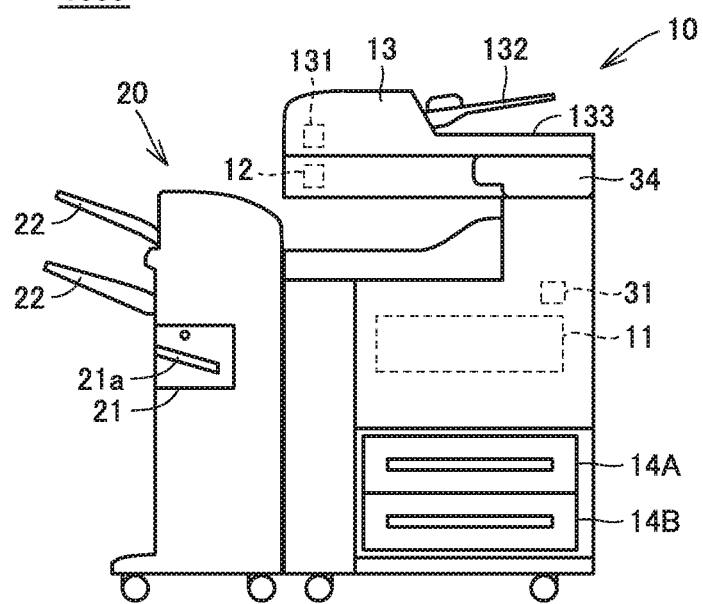
FIG. 1 is a view showing an overall configuration of an image forming system.

Hereinafter, one or more embodiments of the present disclosure will be described with reference to the drawings. However, the scope of the disclosure is not limited to the disclosed embodiments.

An image forming system in an embodiment will be described below with reference to the drawings. When the number, amount, or the like is referred to in the embodiment described below, the scope of the present disclosure is not necessarily limited to such a number, amount, or the like, unless otherwise specified. Identical or corresponding parts will be designated by the same reference numerals, and redundant description may not be repeated.

In the drawings, there are some parts that are not shown in accordance with the ratio of actual dimensions, but are shown with the ratio being changed to clarify a structure for easier understanding of the structure. It should be noted that variations described below may be selectively combined as appropriate.

In the following, a configuration including an image forming apparatus and a post-processing apparatus is referred to as an "image forming system". It should be noted that, in the image forming system, the post-processing apparatus may be built in the image forming apparatus.

<A. Overall Configuration of Image Forming System>

FIG. 1 is a view showing an overall configuration of an image forming system 1000.

Referring to FIG. 1, image forming system 1000 includes an image forming apparatus 10 and a post-processing apparatus 20. In the present embodiment, as a typical example of image forming apparatus 10, a multi-functional peripheral (MFT) is shown, which includes a plurality of functions such as a scanner function, a copy function, a facsimile function, a network function, and a BOX function.

(al. Image Forming Apparatus 10)

Image forming apparatus 10 has a controller 31, an operation panel 34, an automatic original feeding device (ADF: Auto Document Feeder) 13, an image reading device (scanner) 12, sheet supply units 14A and 14B, and an image forming unit 11. Automatic original feeding device 13 has an image reading device (scanner) 131, a tray 132 from which an original is supplied into the device, and a tray 133 to which the original is ejected from the device.

Typically, image forming system 1000 (specifically, image forming apparatus 10) is communicably connected to various information processing apparatuses (for example, a server apparatus, a personal computer, a tablet computer) via a network. When image forming system 1000 receives a job from the personal computer or the tablet computer, image forming system 1000 performs the job.

Operation panel 34 receives a user operation. Image forming system 1000 performs a job instructed using operation panel 34.

Controller 31 controls overall operation of image forming system 1000. Specifically, controller 31 causes each component of image forming system 1000 to operate based on a content set through operation panel 34.

Image reading device 12 is a platen-type device that reads originals one by one using a platen glass.

Automatic original feeding device 13 is a sheet-through-type device that can automatically read a plurality of originals. When both sides of an original are read using automatic original feeding device 13, the back side of the original is read with image reading device 131 of automatic original feeding device 13, and the front side of the original is read with image reading device 12. It should be noted that, instead of such a configuration of simultaneously reading both sides of an original, a configuration of sequentially reading both sides of an original by automatically reversing the original may be adopted. When the latter configuration of automatically reversing the original is adopted, image reading device 131 of automatic original feeding device 13 is not necessary.

Sheets are accommodated in sheet supply units 14A and 14B. Sheet supply units 14A and 14B supply the accommodated sheets to image forming unit 11.

Image forming unit 11 forms a toner image in accordance with an image pattern of a print object, and prints the toner image on a sheet. A timing roller adjusts transport of the sheet in accordance with the position of the toner image transported within the image forming unit, based on a result of detection of the sheet by a timing sensor. Thereby, the toner image formed by the image forming unit is printed at an appropriate position of the sheet.

(a2. Post-Processing Apparatus 20)

Post-processing apparatus 20 has a staple processing device 21 and a plurality of ejection trays 22. To post-processing apparatus 20, a sheet for which print processing is completed is transported from image forming apparatus 10. Post-processing apparatus 20 applies processing (post-processing) to the sheet for which print processing is completed, and ejects the sheet to ejection tray 22.

Staple processing device 21 (a staple mechanism, a staple unit) operates when a user sets auto staple processing, or when the user inserts sheets into a sheet insertion opening 21a such that manual staple processing is performed thereon. In the case of auto staple processing, staple processing device 21 staples an ejected bundle of sheets before the bundle of sheets are ejected to ejection tray 22.

In addition, post-processing apparatus 20 includes a transport unit, a saddle unit, and an alignment unit which are not shown. The transport unit performs processing such as punching and Z-folding on a sheet transported from image forming apparatus 10. The saddle unit performs processing related to saddle stitching, center folding, and three-folding. The alignment unit performs sheet alignment processing in longitudinal/lateral directions and shift processing in a sheet width direction, on a plurality of sheets.

<B. Stapler>

Figure 2A:
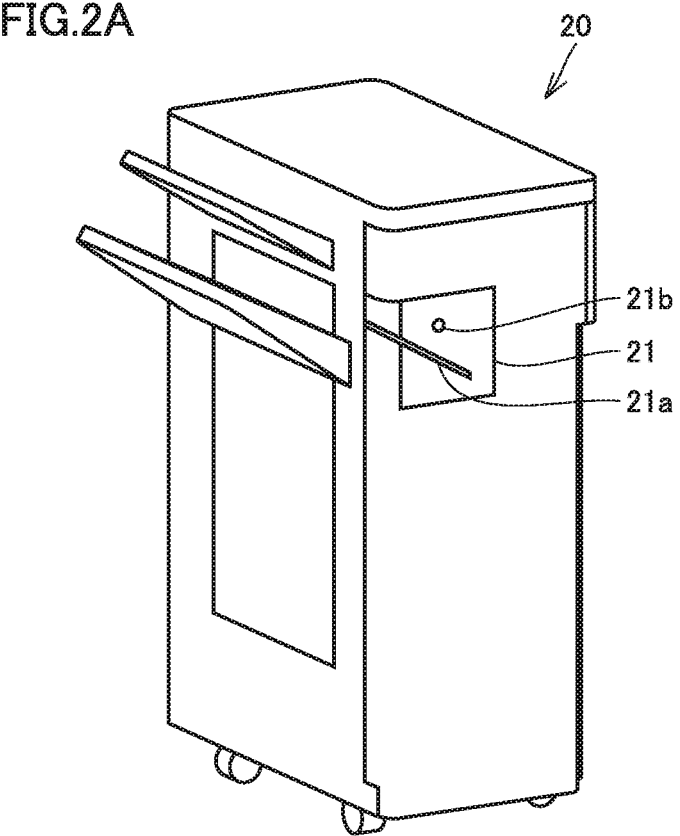
FIG. 2A is an overall perspective view of a post-processing apparatus including a staple processing device.
Figure 2B:
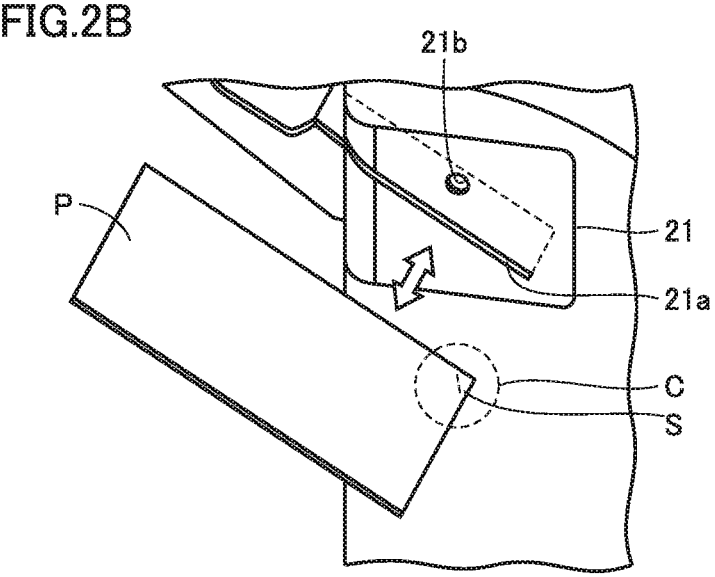
FIG. 2B is a schematic view for illustrating manual staple processing performed in the staple processing device.

As described above, post-processing apparatus 20 is provided with staple processing device 21 capable of performing auto staple processing and manual staple processing. FIG. 2 is a view showing staple processing device 21 included in post-processing apparatus 20. FIG. 2A is an overall perspective view of post-processing apparatus 20 including staple processing device 21. FIG. 2B is a schematic view for illustrating manual staple processing performed in staple processing device 21.

Staple processing device 21 is a device for performing staple processing for binding a plurality of sheets. Staple processing device 21 includes slit-shaped sheet insertion opening 21a into which a plurality of sheets can be inserted, in a front surface of post-processing apparatus 20.

Although not shown, a staple unit is provided inside staple processing device 21, which drives a needle through a plurality of sheets and bends the driven needle to bind the sheets. The staple unit can be used in common for auto staple processing and manual staple processing. That is, in the case of auto staple processing, the staple unit inside staple processing device 21 performs the staple processing at a position where it abuts with a bundle of sheets before being ejected to ejection tray 22, and in the case of manual staple processing, the staple unit performs the staple processing at a position where it abuts with a bundle of sheets inserted into sheet insertion opening 21a. The staple unit stands by at a position where it can perform manual staple processing immediately after sheets are inserted, except when auto staple processing is performed.

Further, staple processing device 21 includes a light emitting unit 21b constituted by an LED or the like, above sheet insertion opening 21a. Light emitting unit 21b emits green light when manual staple processing can be performed in staple processing device 21, and emits red light when manual staple processing cannot be performed in staple processing device 21, informing the user of whether or not manual staple processing can be performed. Whether or not manual staple processing can be used can be determined using a sheet detection sensor (not shown) provided at sheet insertion opening 21a.

As shown in FIG. 2B, a bundle of sheets P is inserted by the user to fit the slit shape of sheet insertion opening 21a. A region C is a corner portion of the bundle of sheets P to be stapled. Region C is inserted in a direction in which it will abut with the staple unit inside staple processing device 21. When the sheet detection sensor detects that sheets are inserted into the insertion opening, light emitting unit 21b emits red light, and the staple unit drives a needle S into region C. When the sheet detection sensor detects that manual staple processing is completed and the sheets are removed from the insertion opening, light emitting unit 21b emits green light.

<C. Hardware Configuration of Image Forming Apparatus 10>

Figure 3:
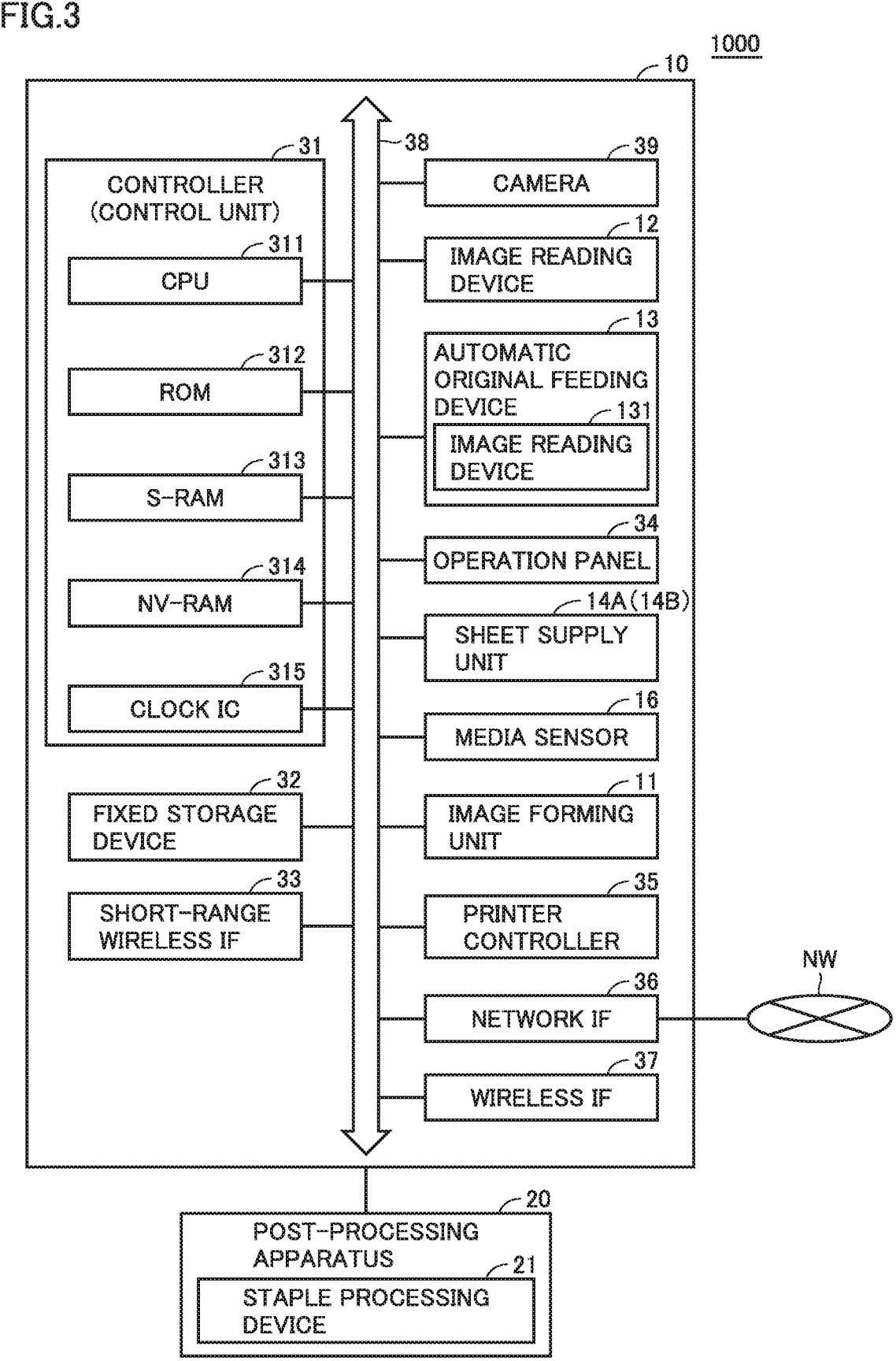
FIG. 3 is a block diagram for illustrating an example of a hardware configuration of the image forming system.

FIG. 3 is a block diagram for illustrating an example of a hardware configuration of image forming system 1000.

Referring to FIG. 3, image forming apparatus 10 has controller 31, a fixed storage device 32, a short-range wireless interface (IF) 33, a camera 39, image reading device 12, automatic original feeding device 13, operation panel 34, sheet supply units 14A and 14B, a media sensor 16, image forming unit 11, a printer controller 35, a network IF 36, and a wireless IF 37. Components 11, 12, 14A, 14B, 16, and 32 to 37 are connected to controller 31 via a bus 38.

Controller 31 has a central processing unit (CPU) 311, a read-only memory (ROM) 312 storing a control program, a static random access memory (S-RAM) 313 for working, a battery backup non-volatile RAM (NV-RAM: non-volatile memory) 314 storing various settings for image formation, and a clock integrated circuit (IC) 315. Components 311 to 315 are connected via bus 38.

As described above, automatic original feeding device 13 has image reading device 131.

Operation panel 34 has keys for performing various inputs, and a display unit. Typically, operation panel 34 includes a touch screen and hardware keys. The touch screen is a device in which a touch panel is placed on a display.

Camera 39 captures an image of the user. The image captured by camera 39 is transmitted to controller 31. Based on the image, controller 31 specifies an area where the user is looking at (i.e., a line-of-sight area) in an operation screen.

Network IF 36 transmits and receives various types of information to and from external apparatuses including a PC (not shown) and another image forming apparatus (not shown) connected through a network NW.

Printer controller 35 generates a copied image from print data received through network IF 36. Image forming unit 11 forms the copied image on a sheet.

It should be noted that fixed storage device 32 is typically a hard disk device. Fixed storage device 32 stores various types of data.

As described above, post-processing apparatus 20 includes staple processing device 21 capable of performing auto staple processing and manual staple processing.

<D. Overview of Processing>

Figure 4:
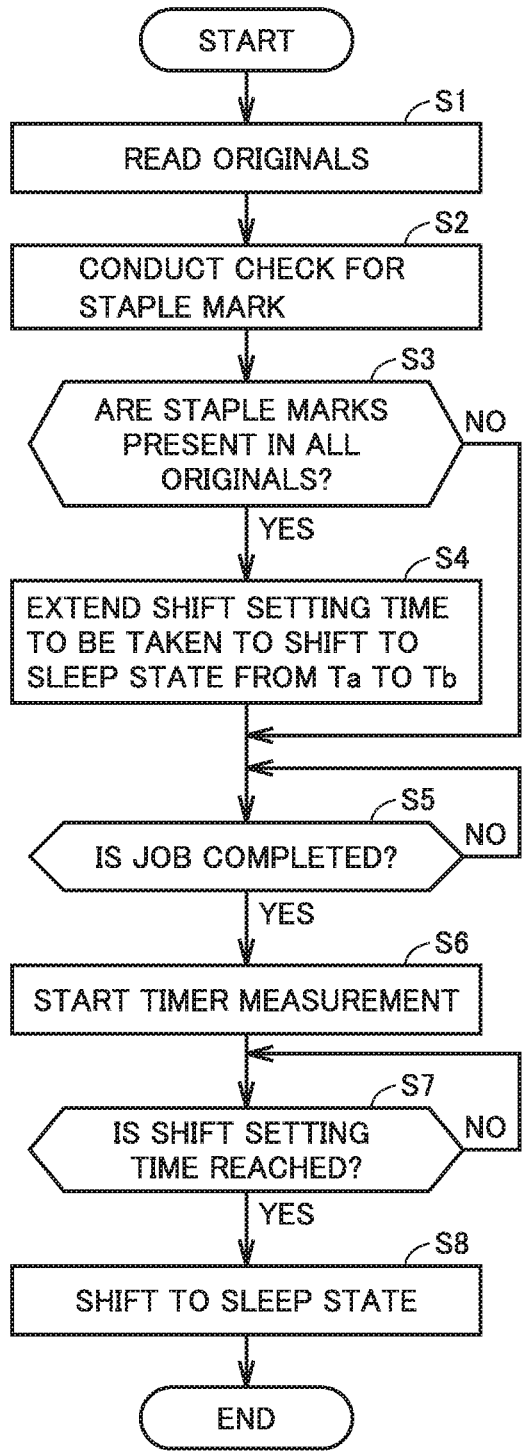
FIG. 4 is a flowchart for illustrating an overview of processing of the image forming system.

FIG. 4 is a flowchart for illustrating an overview of processing of image forming system 1000.

Referring to FIG. 4, in step S1, image forming apparatus 10 reads one or a plurality of originals. In step S2, controller 31 of image forming apparatus 10 checks whether or not a staple mark is present in each read original.

In step S3, controller 31 determines whether or not staple marks are present in all of the originals. When controller 31 determines that staple marks are present in all of the originals (YES in step S3), in step S4, controller 31 extends a shift setting time to be taken until image forming apparatus 10 shifts to a sleep state (sleep mode), from a default time Ta (a predetermined time) to a time Tb. When controller 31 does not determine that staple marks are present in all of the originals (NO in step S3), controller 31 advances the processing to step S5.

In step S5, controller 31 determines whether or not a job is completed. "Completion of a job" refers to completion of printing when the job is copying, completion of data transmission when the job is scanning and transmission, and completion of data storage when the job is storing data in a box. It should be noted that one job includes not only processing (copying, scanning and transmission, storing data in a box) for one original but also processing for a plurality of originals.

In step S6, controller 31 starts timer measurement. Specifically, controller 31 starts a timer to determine whether or not the shift setting time is reached. The timer may be a count-up timer or a count-down timer.

In step S7, controller 31 determines whether or not the shift setting time is reached. When controller 31 determines that the shift setting time is reached (YES in step S7), in step S8, controller 31 transitions the state of image forming apparatus 10 to the sleep state (power saving state). When controller 31 determines that the shift setting time is not reached (NO in step S7), controller 31 returns the processing to step S7.

When the state of image forming apparatus 10 transitions to the sleep state, power supply from image forming apparatus 10 to post-processing apparatus 20 is cut off. Thereby, post-processing apparatus 20 cannot perform manual staple processing.

Although the above description has been given of an exemplary configuration in which the shift setting time is extended on condition that staple marks are present in all of the originals, the present disclosure is not limited thereto. For example, controller 31 may be configured to extend the shift setting time on condition that a staple mark is present in at least one original of the plurality of originals.

The overview of processing of image forming system 1000 will be described below in more detail.

Figure 5:
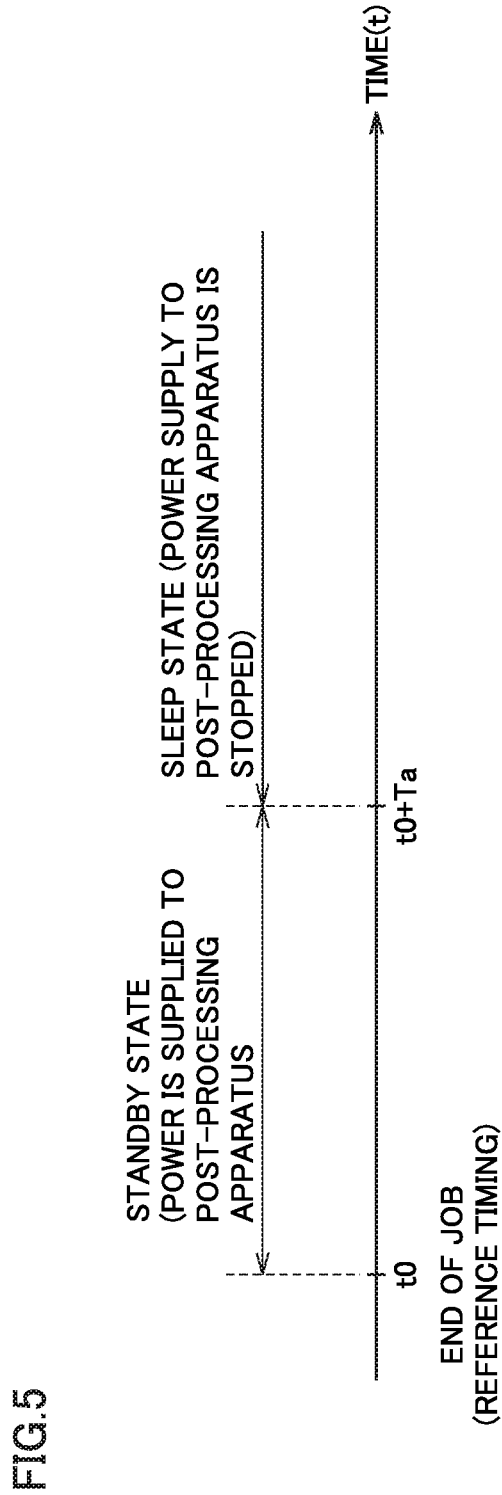
FIG. 5 is a schematic view for illustrating state transition of an image forming apparatus when it is not determined that staple marks are present in all originals.

FIG. 5 is a schematic view for illustrating state transition of image forming apparatus 10 when it is not determined that staple marks are present in all of the originals (i.e., when a staple mark is absent in at least one original).

Referring to FIG. 5, when a job ends at a time t0, controller 31 is thereafter in a standby state for a time Ta. That is, controller 31 is in the standby state until a time t0+Ta. In the standby state, power supply to post-processing apparatus 20 is continued.

At time t0+Ta, controller 31 transitions the state of image forming apparatus 10 from the standby state to the sleep state. The sleep state is a state in which power consumption is smaller than that in the standby state. In the sleep state, power supply to post-processing apparatus 20 is cut off. Thus, at and after time t0+Ta, post-processing apparatus 20 cannot perform manual staple processing, unless power supply is resumed (i.e., unless state transition from the sleep state to the standby state or the like is made).

Figure 6:
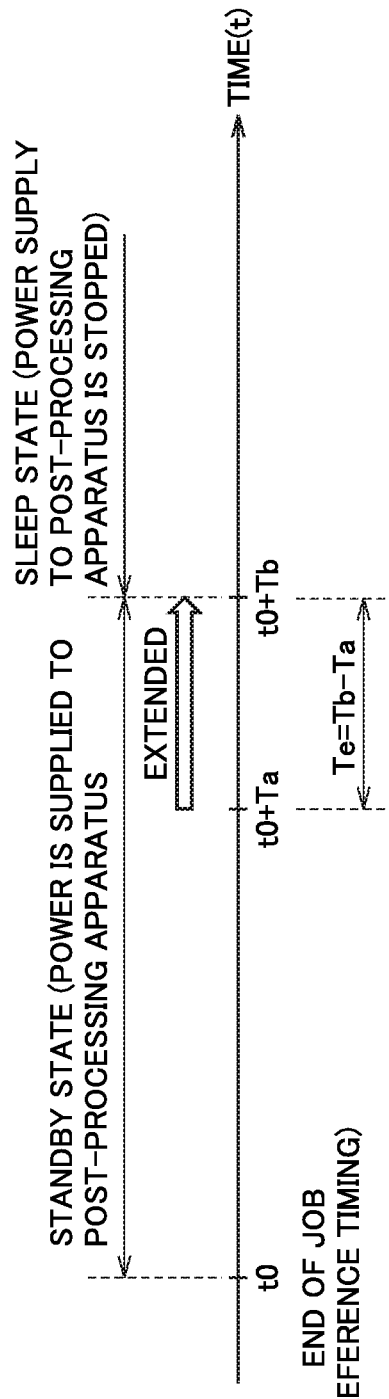
FIG. 6 is a schematic view for illustrating state transition of the image forming apparatus when it is determined that staple marks are present in all originals.

FIG. 6 is a schematic view for illustrating state transition of image forming apparatus 10 when it is determined that staple marks are present in all of the originals.

Referring to FIG. 6, when a job ends at time t0, controller 31 is thereafter in the standby state for a time Tb (>Ta). That is, controller 31 is in the standby state until a time t0+Tb. That is, the standby state is extended by a time Te (=Tb−Ta), as compared with the case in FIG. 5. At time t0+Tb, controller 31 transitions the state of image forming apparatus 10 from the standby state to the sleep state. In the present example, it is assumed that extended time Te (=Tb−Ta) has a constant value.

Therefore, when staple marks are present in all of the originals, the user can perform manual staple processing using post-processing apparatus 20 even after time t0+Ta has elapsed, unless time t0+Tb has elapsed.

As described above, when staple marks are present in all of the originals, the shift setting time to be taken to transition to the sleep state is extended. Therefore, with image forming system 1000, manual staple processing can be promptly performed. Further, since the time to be taken to shift to the sleep state (shift setting time) is extended only when staple marks are present in all of the originals, an increase in the amount of power consumption can be suppressed, as compared with a configuration in which the shift setting time is always set to time Tb, for example.

<E. Functional Configuration>

Figure 7:
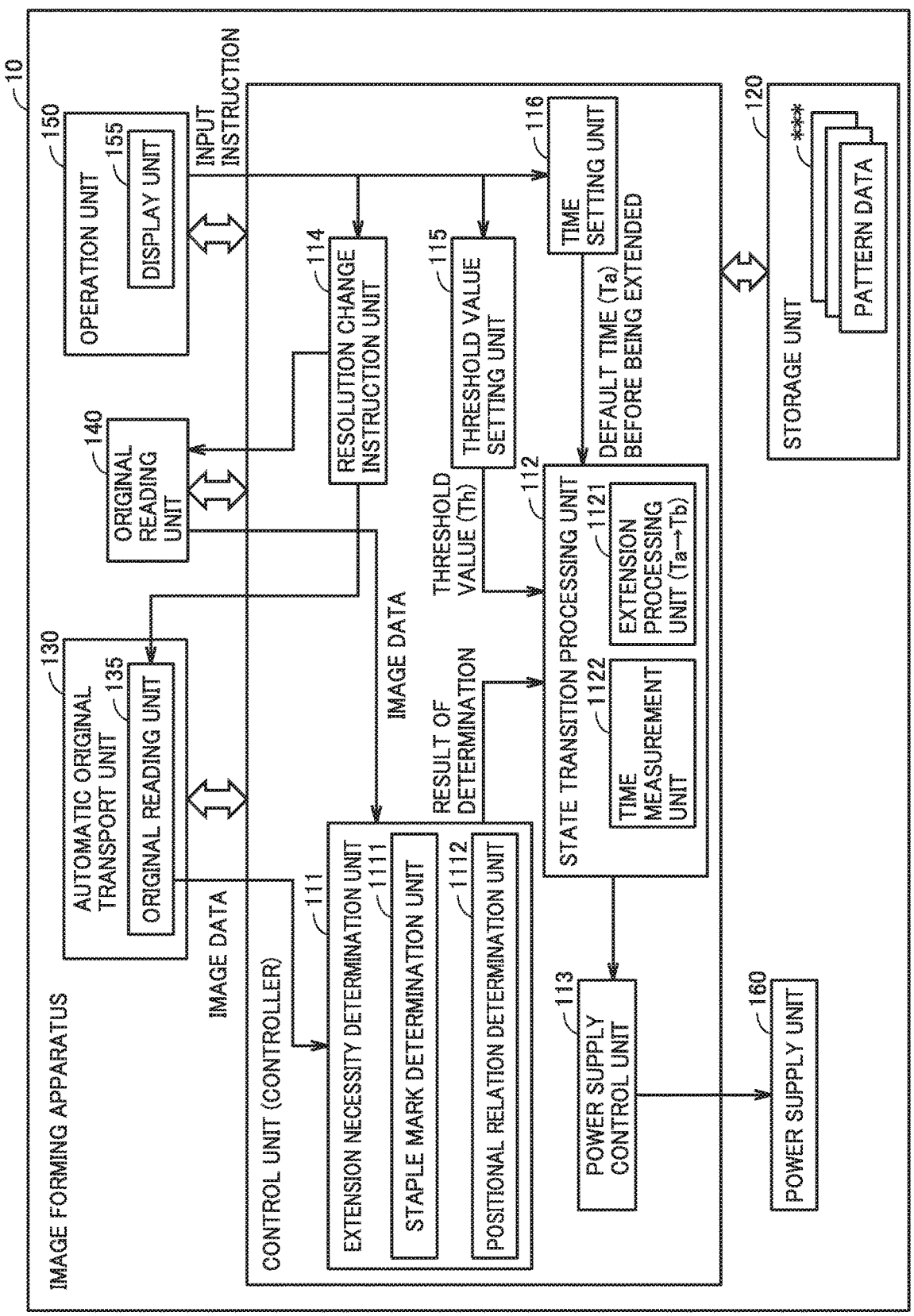
FIG. 7 is a functional block diagram for illustrating a functional configuration of the image forming apparatus.

FIG. 7 is a functional block diagram for illustrating a functional configuration of image forming apparatus 10.

Referring to FIG. 7, image forming apparatus 10 includes a control unit 110, a storage unit 120, an automatic original transport unit 130, an original reading unit 140, an operation unit 150, and a power supply unit 160.

Control unit 110 corresponds to controller 31. Control unit 110 includes an extension necessity determination unit 111, a state transition processing unit 112, a power supply control unit 113, a resolution change instruction unit 114, a threshold value setting unit 115, and a time setting unit 116. Extension necessity determination unit 111 has a staple mark determination unit 1111 and a positional relation determination unit 1112. State transition processing unit 112 has an extension processing unit 1121 and a time measurement unit 1122.

Automatic original transport unit 130 corresponds to automatic original feeding device 13. An original reading unit 135 corresponds to image reading device 131 (see FIGS. 1 and 3).

Original reading unit 140 corresponds to image reading device 12 (see FIGS. 1 and 3).

Operation unit 150 includes a display unit 155. Operation unit 150 corresponds to operation panel 34.

Storage unit 120 corresponds to fixed storage device 32 (see FIG. 3), for example. Storage unit 120 stores a plurality of pattern data. Each pattern data is used to determine whether or not image data (a read result) is a staple mark. Specifically, each pattern data is data for specifying a staple mark (feature data). It should be noted that image forming apparatus 10 may store each pattern data in control unit 110.

Image data read by original reading units 135 and 140 are input into control unit 110. Further, an instruction from operation unit 150 (a user instruction) is input into control unit 110. Furthermore, an instruction from an external information processing apparatus (not shown) is input into control unit 110 through a network. In addition, control unit 110 causes display unit 155 to display various images.

Of components 111 to 116 of control unit 110, extension necessity determination unit 111, state transition processing unit 112, and power supply control unit 113 will be described first. For extension necessity determination unit 111, staple mark determination unit 1111 will be described. The remaining components will be described in variations described below.

Staple mark determination unit 1111 of extension necessity determination unit 111 determines whether or not a staple mark is present in an original. Specifically, when an original is read with image reading devices 12 and 131, staple mark determination unit 1111 determines whether or not a staple mark is present in the original, based on a read result.

For example, when a plurality of originals are continuously read using automatic original transport unit 130, staple mark determination unit 1111 determines whether or not a staple mark is present in each of the plurality of originals, based on image data that is a read result. Further, when both sides of an original are read, staple mark determination unit 1111 determines whether or not staple marks are present on the both sides of the original, based on image data of the front side and image data of the back side obtained by reading. It should be noted that, since the method for detecting a staple mark is conventionally known, the description thereof is not repeated here.

Based on a result of determination of staple mark determination unit 1111, extension necessity determination unit 111 determines whether or not it is necessary to extend the shift setting time from default time Ta to Tb, based on the staple marks. Extension necessity determination unit 111 notifies state transition processing unit 112 of the result of determination. In the case of the above example, when extension necessity determination unit 111 determines that staple marks are present in all of the originals, extension necessity determination unit 111 notifies state transition processing unit 112 that it is necessary to extend the shift setting time.

State transition processing unit 112 transitions the state of image forming apparatus 10 from the standby state to the sleep state, from the sleep state to the standby state or an operating state, for example. Upon receiving a notification that it is necessary to extend the shift setting time from extension necessity determination unit 111, state transition processing unit 112 extends the shift setting time to be taken to shift to the sleep state, from default time Ta to time Tb, using extension processing unit 1121.

In the case of the above example, time measurement unit 1122 starts time measurement, using end of a job, which is an example of reference timing, as a trigger. When time Tb has elapsed since the start of time measurement, state transition processing unit 112 transitions the state of image forming apparatus 10 from the standby state to the sleep state.

Along with the state transition, state transition processing unit 112 notifies power supply control unit 113 of the state after transition.

In the case of the operating state or the standby state, power supply control unit 113 causes power supply unit 160 to supply power to post-processing apparatus 20. On the other hand, in the case of the sleep state, power supply control unit 113 cuts off power supply from power supply unit 160 to post-processing apparatus 20. Specifically, power supply control unit 113 stops power supply to post-processing apparatus 20 on condition that the shift setting time has elapsed since the end of the job.

More specifically, when the shift setting time is not extended, power supply control unit 113 stops power supply to post-processing apparatus 20 on condition that time Ta has elapsed since the end of the job. When the shift setting time is extended, power supply control unit 113 stops power supply to post-processing apparatus 20 on condition that time Tb has elapsed since the end of the job.

(Overview)

As described above, image forming apparatus 10 includes: power supply control unit 113 that stops power supply to the post-processing apparatus on condition that a predetermined time (shift setting time) has elapsed since reference timing (end of a job); staple mark determination unit 1111 that determines, when an original is read with image reading devices 12 and 131, the presence or absence of a staple mark in the original based on a read result; and extension processing unit 1121 that extends the predetermined time (shift setting time) when it is determined that a staple mark is present.

<F. Variations of Determination of Necessity for Extension>

Next, a plurality of variations of determination of necessity for extension will be described.

(f1. First Variation)

Figure 8:
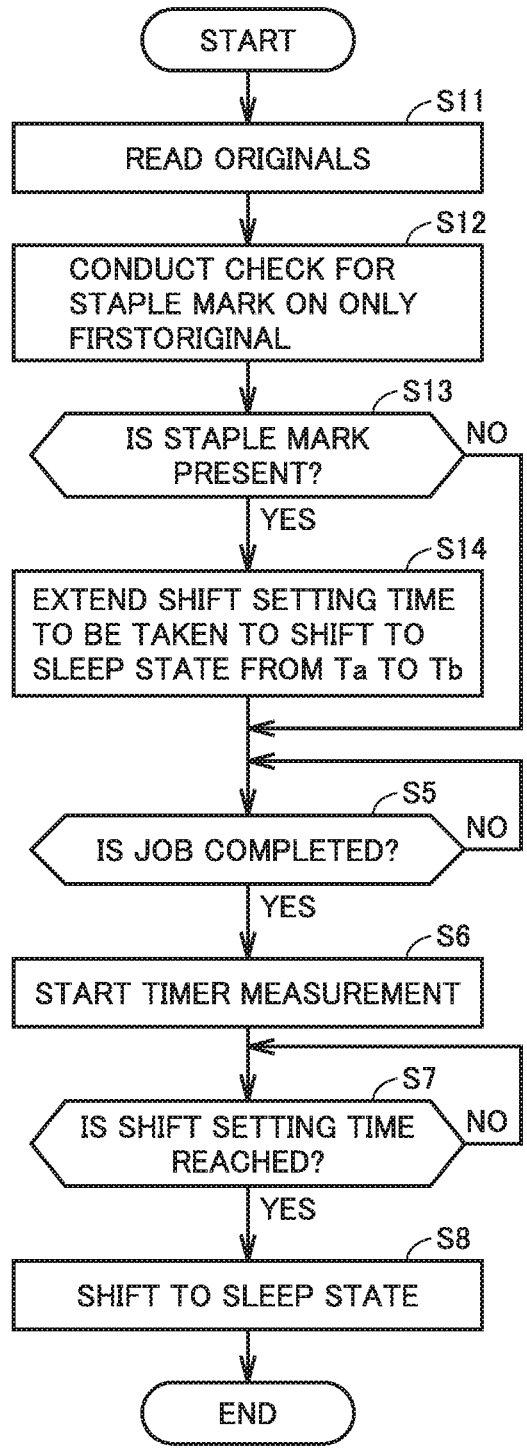
FIG. 8 is a flowchart for illustrating an overview of processing in a first variation.

FIG. 8 is a flowchart for illustrating an overview of processing in a first variation.

Referring to FIG. 8, in step S11, image forming apparatus 10 reads one or a plurality of originals. In step S12, image forming apparatus 10 conducts a check for a staple mark on only a first original. That is, even when two or more originals are continuously read, image forming apparatus 10 does not conduct a check for a staple mark on second and subsequent originals.

When controller 31 determines that a staple mark is present in the first original (YES in step S13), in step S14, controller 31 extends the shift setting time to be taken until image forming apparatus 10 shifts to the sleep state, from default time Ta to time Tb. When controller 31 determines that a staple mark is absent in the first original (NO in step S13), controller 31 advances the processing to step S5.

It should be noted that, since steps S5, S6, S7, and S8 are already described based on FIG. 4, the description thereof is not repeated. The same applies to other variations described later.

As described above, since image forming apparatus 10 (specifically, controller 31) conducts a check for a staple mark on only the first original, a load on image forming apparatus 10 can be reduced, as compared with a configuration in which the image forming apparatus conducts a check for a staple mark on all of the originals.

(f2. Second Variation)

Figure 9:
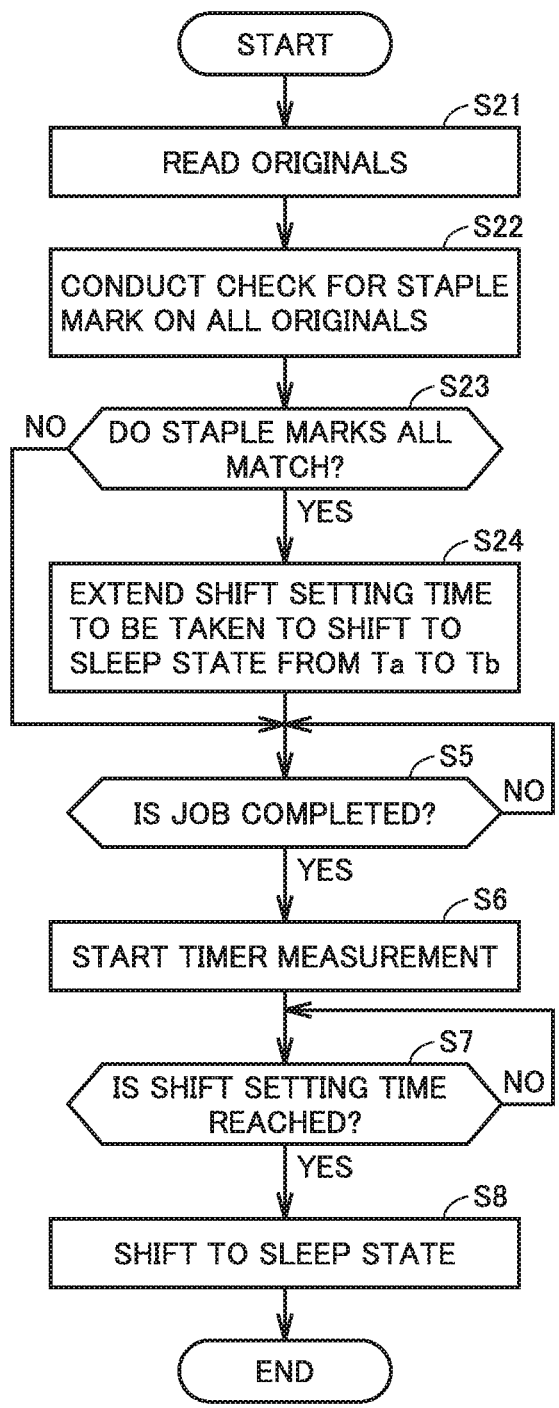
FIG. 9 is a flowchart for illustrating an overview of processing in a second variation.

FIG. 9 is a flowchart for illustrating an overview of processing in a second variation.

Referring to FIG. 9, in step S21, image forming apparatus 10 reads a plurality of originals. In step S22, image forming apparatus 10 checks whether or not a staple mark is present in each read original.

In step S23, controller 31 of image forming apparatus 10 compares staple marks in all of the originals, and determines whether or not the staple marks match. Specifically, positional relation determination unit 1112 (see FIG. 7) of extension necessity determination unit 111 determines whether or not positions of the staple marks match each other.

When controller 31 determines that the staple marks in all of the originals match (YES in step S23), in step S24, controller 31 extends the shift setting time to be taken until image forming apparatus 10 shifts to the sleep state, from default time Ta to time Tb. When it is determined that the staple marks in all of the originals do not match (NO in step S23), image forming apparatus 10 advances the processing to step S5.

As described above, image forming apparatus 10 (specifically, controller 31) extends the shift setting time on condition that the positions of a plurality of staple marks match each other. When the positions of the plurality of staple marks match each other, there is a high possibility that the plurality of originals have been bound with the same staple before being read by image forming apparatus 10. Accordingly, there is a high possibility that staple processing will be performed again on these originals.

Therefore, useless extension can be suppressed, as compared with a configuration in which the image forming apparatus extends the shift setting time even when the positions of the plurality of staple marks do not match each other.

(f3. Third Variation)

Figure 10:
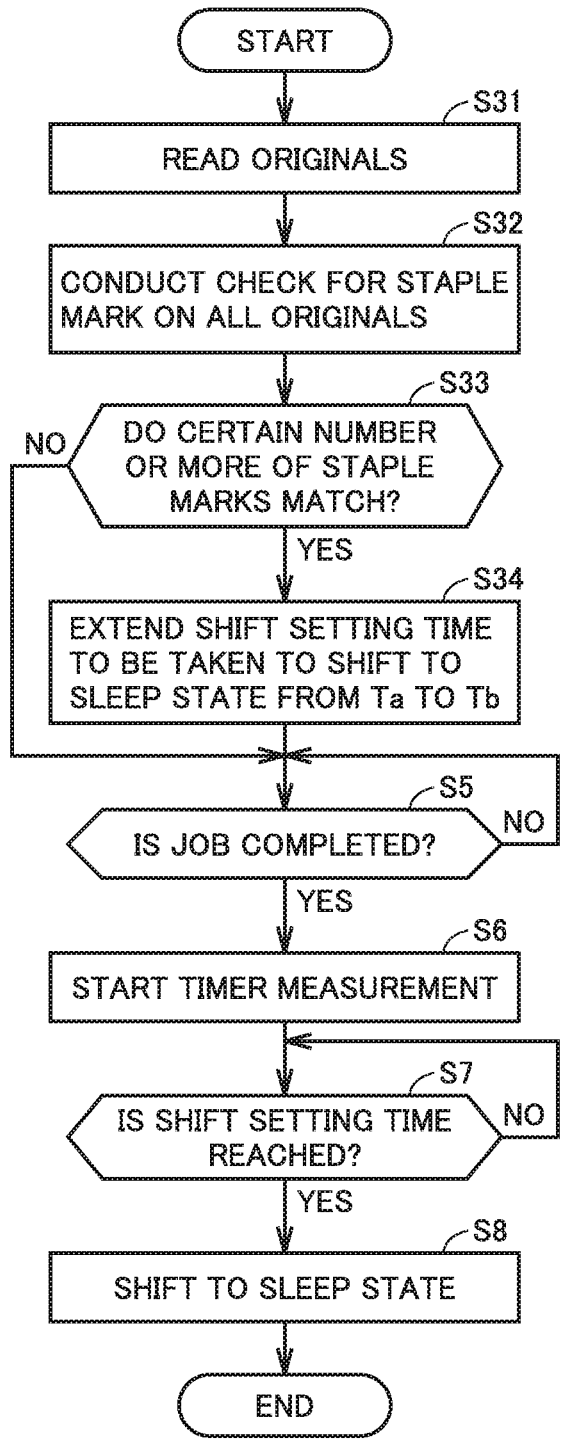
FIG. 10 is a flowchart for illustrating an overview of processing in a third variation.

FIG. 10 is a flowchart for illustrating an overview of processing in a third variation.

Referring to FIG. 10, in step S31, image forming apparatus 10 reads a plurality of originals. In step S32, image forming apparatus 10 checks whether or not a staple mark is present in each read original.

In step S33, controller 31 of image forming apparatus 10 compares staple marks in all of the originals, and determines whether or not a certain number or more of the staple marks match. Specifically, extension necessity determination unit 111 performs the above determination based on a result of determination by positional relation determination unit 1112 (see FIG. 7).

When controller 31 determines that the certain number or more of the staple marks match (YES in step S33), in step S34, controller 31 extends the shift setting time to be taken until image forming apparatus 10 shifts to the sleep state, from default time Ta to time Tb. When it is determined that the number of matching staple marks is less than the certain number (NO in step S33), image forming apparatus 10 advances the processing to step S5.

There may occur a case where staple marks are not detected even though originals that have been stapled are read. The above processing is effective in such a case. It should be noted that the certain number described above may be a fixed value, or a value that can be changed by the user.

Further, instead of the certain number, a certain percentage may be used as a criterion for determination. That is, the shift setting time may be extended on condition that the positions of the staple marks in a predetermined percentage or more of originals of the plurality of originals match.

(f4. Fourth Variation)

Figure 11:
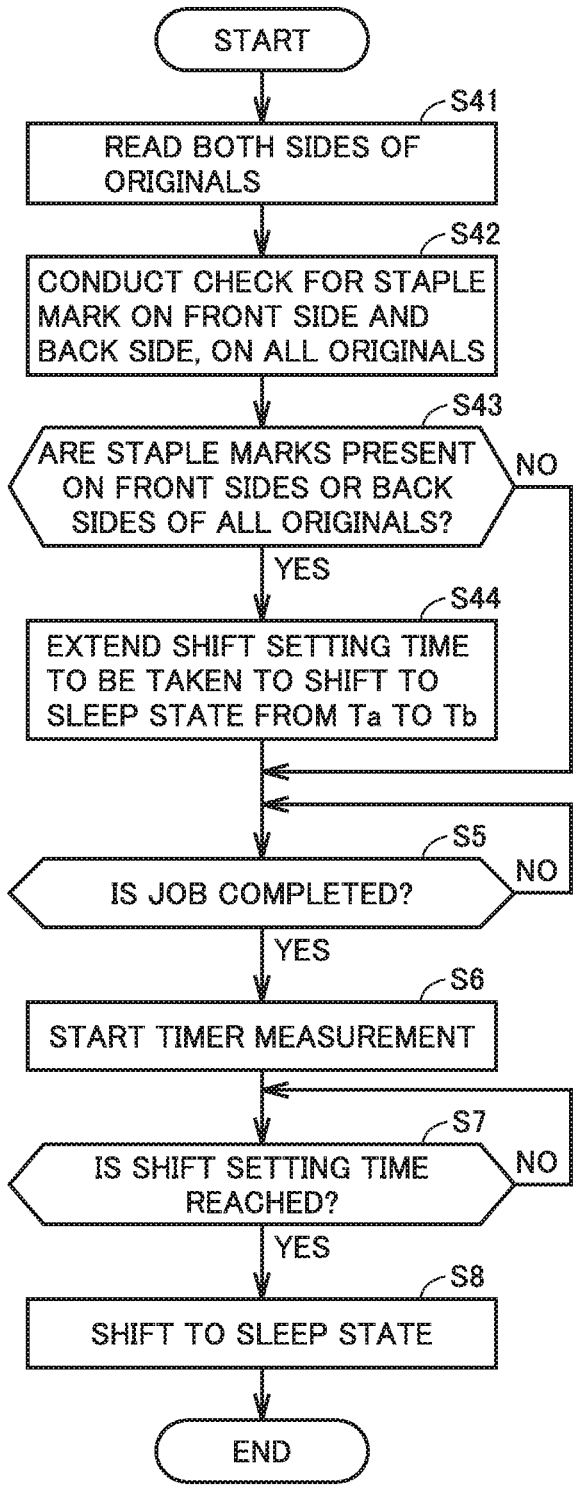
FIG. 11 is a flowchart for illustrating an overview of processing in a fourth variation.

FIG. 11 is a flowchart for illustrating an overview of processing in a fourth variation.

Referring to FIG. 11, in step S41, image forming apparatus 10 reads one or a plurality of originals. In step S42, image forming apparatus 10 conducts a check for a staple mark on a front side and a back side, on all of the originals (when only one original is read, on the one original).

When controller 31 of image forming apparatus 10 determines that staple marks are present on the front sides or the back sides of all of the originals (YES in step S43), in step S44, controller 31 extends the shift setting time to be taken until image forming apparatus 10 shifts to the sleep state, from default time Ta to time Tb. When it is not determined that staple marks are present on the front sides or the back sides of all of the originals (NO in step S43), image forming apparatus 10 advances the processing to step S5.

It should be noted that the present disclosure is not limited to the above configuration, and controller 31 may be configured to extend the shift setting time from default time Ta to time Tb, based on a determination that a staple mark is present on the front side or the back side of at least one original. In addition, the shift setting time may be extended from default time Ta to time Tb on condition that a staple mark is detected first, irrespective of the front side or the back side of an original. In the case of these configurations, when a staple mark is detected, it is not necessary to perform determination (detection) of a staple mark on subsequent originals.

(f5. Fifth Variation)

Figure 12:
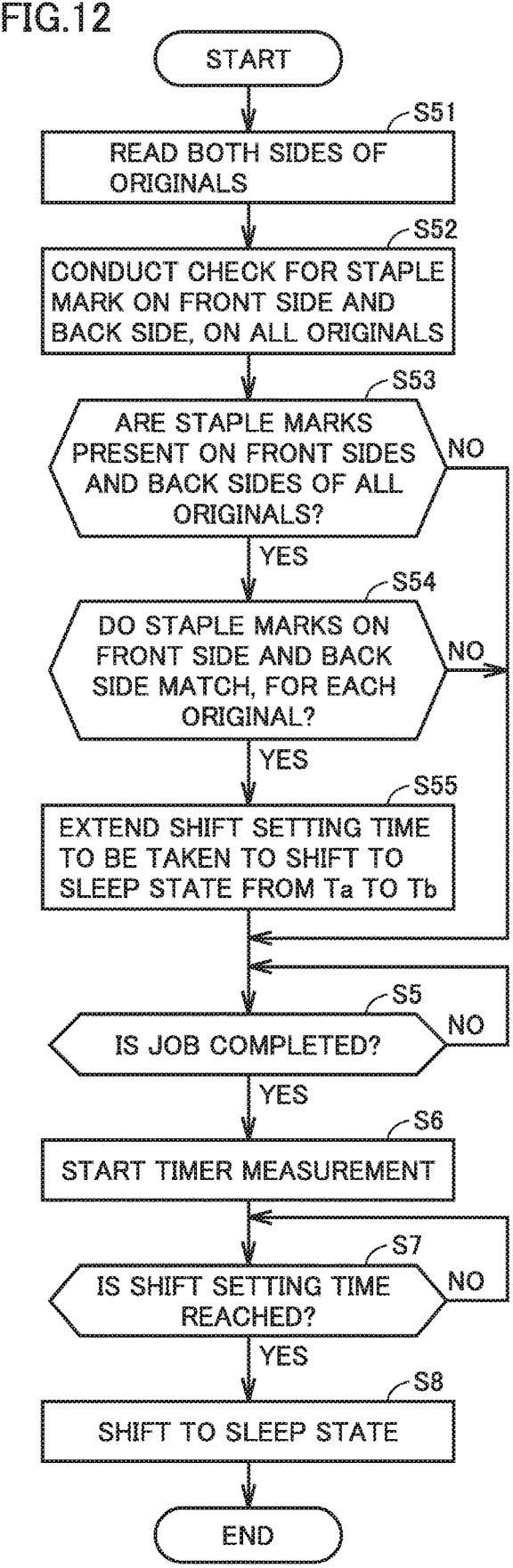
FIG. 12 is a flowchart for illustrating an overview of processing in a fifth variation.

FIG. 12 is a flowchart for illustrating an overview of processing in a fifth variation.

Referring to FIG. 12, in step S51, image forming apparatus 10 reads one or a plurality of originals. In step S52, image forming apparatus 10 conducts a check for a staple mark on the front side and the back side, on all of the originals (when only one original is read, on the one original).

When controller 31 of image forming apparatus 10 determines that staple marks are present on the front sides and the back sides of all of the originals (YES in step S53), in step S54, controller 31 checks whether or not the staple marks on the front side and the back side match, for each original, using positional relation determination unit 1112 (see FIG. 7).

When it is determined that the staple marks on the front side and the back side match for each original (YES in step S54), controller 31 extends the shift setting time to be taken until image forming apparatus 10 shifts to the sleep state, from default time Ta to time Tb.

When a negative determination is made in step S53, or when a negative determination is made in step S54, controller 31 advances the processing to step S5.

It should be noted that the present disclosure is not limited to the above configuration, and controller 31 may be configured to extend the shift setting time from default time Ta to time Tb, based on a determination that staple marks are present on the front side and the back side of at least one original and positions of these staple marks match. In the case of such a configuration, when no staple mark is detected on the front side of an original, it is not necessary to conduct a check for a staple mark on the back side of the original. In addition, in the case of a configuration in which a check for a staple mark on the back side is conducted prior to a check for a staple mark on the front side, when no staple mark is detected on the back side of an original, it is not necessary to conduct a check for a staple mark on the front side of the original.

It should be noted that the expression "the staple marks on the front side and the back side match" means that the staple marks are detected at corresponding positions. For example, when a staple mark is detected at an upper left portion on the front side, "the staple marks on the front side and the back side match" means that a staple mark is detected at an upper right portion on the back side. Specifically, when a staple mark is detected at the upper left portion on the front side, "the staple marks on the front side and the back side match" means that a staple mark is detected at an upper right position that is symmetric with respect to the center line of an original (a line that divides the original into right and left portions).

By using a match between the staple marks on the both sides of an original as a condition for extension of the shift setting time as described above, the staple marks can be determined with high accuracy.

(f6. Sixth Variation)

Figure 13:
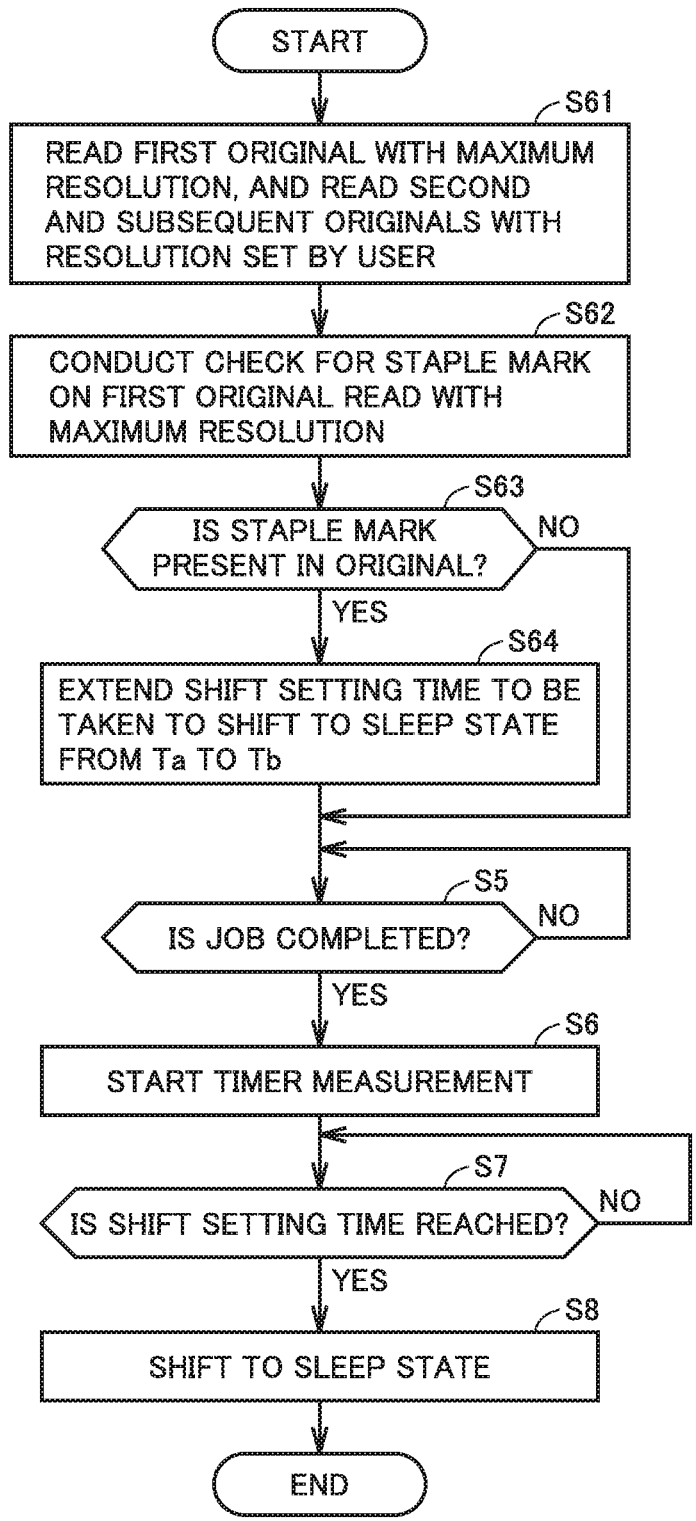
FIG. 13 is a flowchart for illustrating an overview of processing in a sixth variation.

FIG. 13 is a flowchart for illustrating an overview of processing in a sixth variation.

Referring to FIG. 13, in step S61, image forming apparatus 10 reads a first original with a maximum resolution, and reads second and subsequent originals with a resolution set by the user (including a default resolution). In step S62, image forming apparatus 10 conducts a check for a staple mark on only the first original. That is, even when two or more originals are continuously read, image forming apparatus 10 does not conduct a check for a staple mark on the second and subsequent originals.

When controller 31 of image forming apparatus 10 determines that a staple mark is present in the first original (YES in step S63), in step S64, controller 31 extends the shift setting time to be taken until image forming apparatus 10 shifts to the sleep state, from default time Ta to time Tb. When it is determined that a staple mark is absent in the first original (NO in step S63), image forming apparatus 10 advances the processing to step S5.

When an original is read with a low resolution, there may occur a case where, even though a staple mark is present in the original, it is not possible to detect the staple mark. The above processing is effective in such a case.

It should be noted that, although the above description has been given of an exemplary configuration in which the first original is read with the maximum resolution, a predetermined number-th original of the second and subsequent originals may be read with the maximum resolution. Alternatively, all of the originals may be read with the maximum resolution. Alternatively, the originals may be read with the maximum resolution until a staple mark is detected. Further, the resolution used is not necessarily limited to the maximum resolution, and a resolution higher than a setting may be used.

(f7. Seventh Variation)

Figure 14:
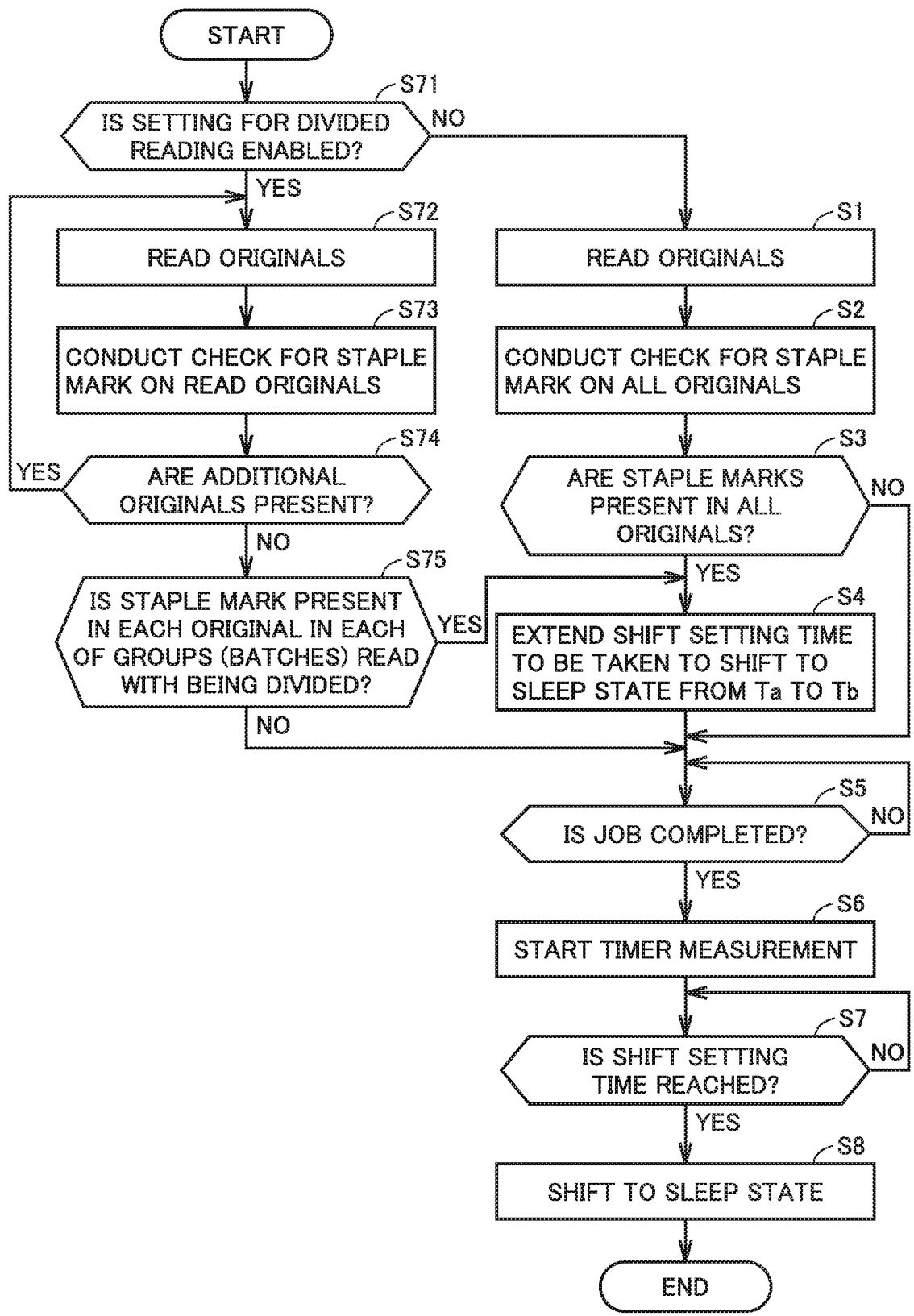
FIG. 14 is a flowchart for illustrating an overview of processing in a seventh variation.

FIG. 14 is a flowchart for illustrating an overview of processing in a seventh variation. Specifically, FIG. 14 is a flowchart when the presence or absence of a setting for divided reading is taken into consideration. It should be noted that divided reading is processing of reading a plurality of originals with being divided into a plurality of batches (a plurality of groups).

Typically, divided reading is used when originals in a number that cannot be placed in tray 132 of the automatic original feeding device are read in a plurality of batches. By performing auto stapling, for example, on copies (sheets having images formed thereon) of the plurality of originals, the copies can be bound together.

Referring to FIG. 14, in step S71, controller 31 determines whether or not the setting for divided reading is enabled. For example, controller 31 determines whether or not the setting for divided reading is enabled, based on the state of a flag indicating the state of the setting for divided reading.

When the setting for divided reading is not enabled (NO in step S71), controller 31 performs the processings in steps S1 to S8, as in the case shown in FIG. 4.

When the setting for divided reading is enabled (YES in step S71), in step S72, image forming apparatus 10 reads a plurality of originals. In step S73, controller 31 conducts a check for a staple mark on the read originals. That is, controller 31 conducts a check for a staple mark on each of the originals in one batch (group).

In step S74, controller 31 determines whether or not additional originals are present. Specifically, controller 31 inquires whether or not to perform additional reading, through operation panel 34. When controller 31 receives a user operation that instructs additional reading through operation panel 34, controller 31 determines that additional originals are present. When controller 31 receives a user operation that instructs not to perform additional reading, controller 31 determines that additional originals are absent, and advances the processing further.

When controller 31 determines that additional originals are present (YES in step S74), controller 31 advances the processing to step S72. When controller 31 determines that additional originals are absent (NO in step S74), in step S75, controller 31 determines whether or not a staple mark is present in each original in each of the groups (batches) read with being divided. That is, controller 31 determines whether or not staple marks are present in all of the read originals. For example, when 100 originals are read with being divided into two groups each including 50 originals, controller 31 determines whether or not staple marks are present in all of the 100 originals.

When controller 31 determines that staple marks are present in all of the read originals (YES in step S75), controller 31 advances the processing to step S4. On the other hand, when controller 31 determines that a staple mark is absent in at least one original of all of the read originals (NO in step S75), controller 31 advances the processing to step S5.

Accordingly, when a positive determination is made in step S75, processing of extending the shift setting time is performed, whereas when a negative determination is made in step S75, the shift setting time is not extended.

Although the above description has been given of an exemplary configuration in which the shift setting time is extended on condition that staple marks are present in all of the originals, the present disclosure is not limited thereto. For example, controller 31 may be configured to extend the shift setting time on condition that a staple mark is present in at least one original of the plurality of originals.

(f8. Eighth Variation)

Figure 15:
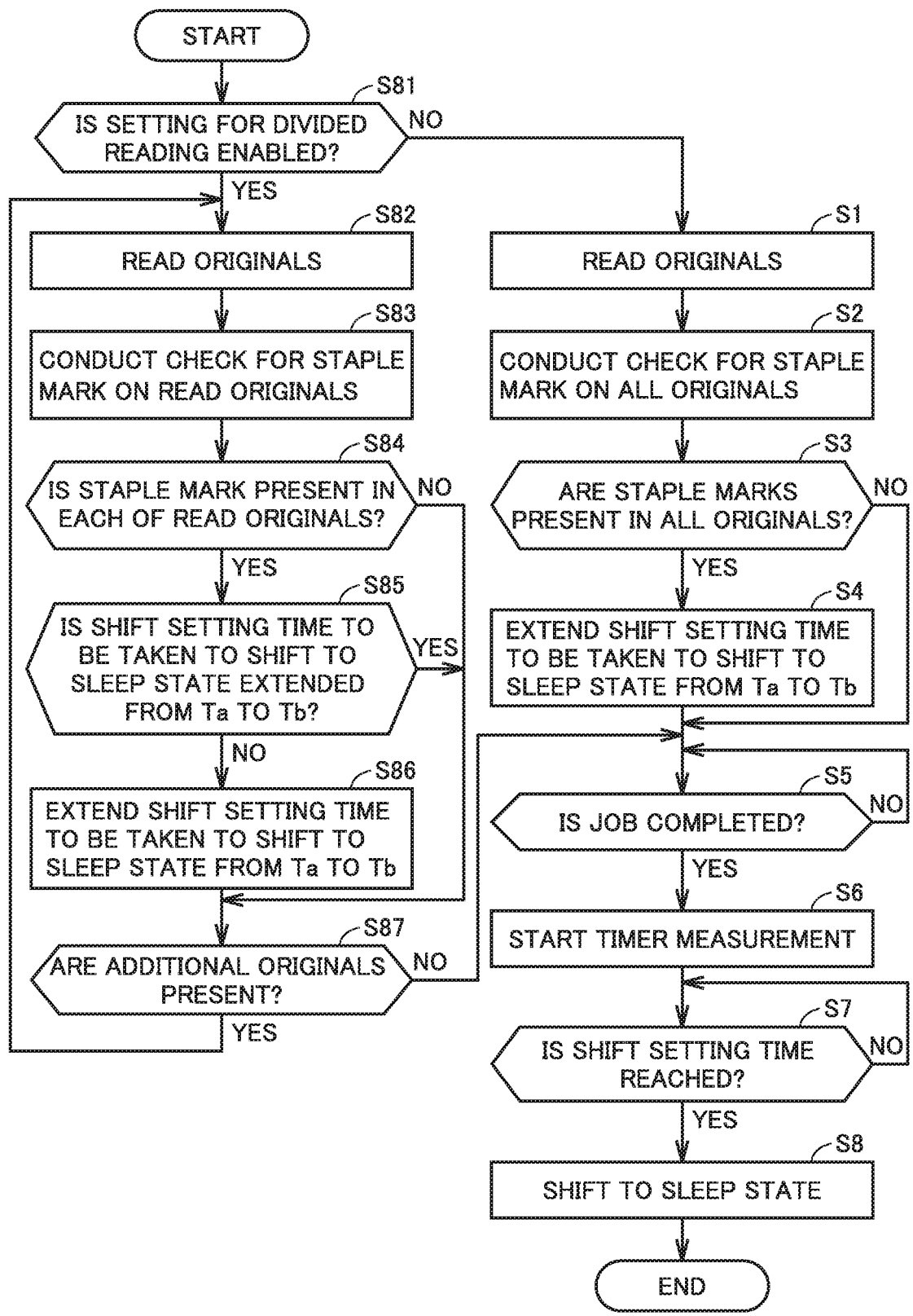
FIG. 15 is a flowchart for illustrating an overview of processing in an eighth variation.

FIG. 15 is a flowchart for illustrating an overview of processing in an eighth variation. Specifically, FIG. 15 is a flowchart when the presence or absence of the setting for divided reading is taken into consideration, as with FIG. 14.

Referring to FIG. 15, in step S81, controller 31 determines whether or not the setting for divided reading is enabled. When the setting for divided reading is not enabled (NO in step S81), controller 31 performs the processings in steps S1 to S8, as in the case shown in FIG. 4.

When the setting for divided reading is enabled (YES in step S81), in step S82, image forming apparatus 10 reads a plurality of originals. In step S83, controller 31 conducts a check for a staple mark on the read originals. That is, controller 31 conducts a check for a staple mark on each of the originals in one batch (group).

In step S84, controller 31 determines whether or not a staple mark is present in each of the read originals (each original in one group). That is, controller 31 determines whether or not staple marks are present in all of the originals in one group.

When controller 31 determines that staple marks are present in all of the originals in one group (YES in step S84), in step S85, controller 31 determines whether or not the shift setting time to be taken to shift to the sleep state is extended from default time Ta to time Tb. When controller 31 does not determine that staple marks are present in all of the originals in one group (NO in step S84), controller 31 advances the processing to step S87.

When the shift setting time to be taken to shift to the sleep state is not extended from default time Ta to time Tb (NO in step S85), in step S86, controller 31 extends the shift setting time from time Ta to time Tb. When the shift setting time to be taken to shift to the sleep state is already extended from time Ta to time Tb (YES in step S85), controller 31 advances the processing to step S87.

In step S87, controller 31 determines whether or not additional originals are present. When controller 31 determines that additional originals are present (YES in step S87), controller 31 advances the processing to step S82. When controller 31 determines that additional originals are absent (NO in step S87), controller 31 advances the processing to step S5.

Although the above description has been given of an exemplary configuration in which the shift setting time is extended on condition that staple marks are present in all of the originals in a group, the present disclosure is not limited thereto. For example, controller 31 may be configured to extend the shift setting time on condition that a staple mark is present in at least one original of the plurality of originals in a group.

(f9. Ninth Variation)

Figure 16:
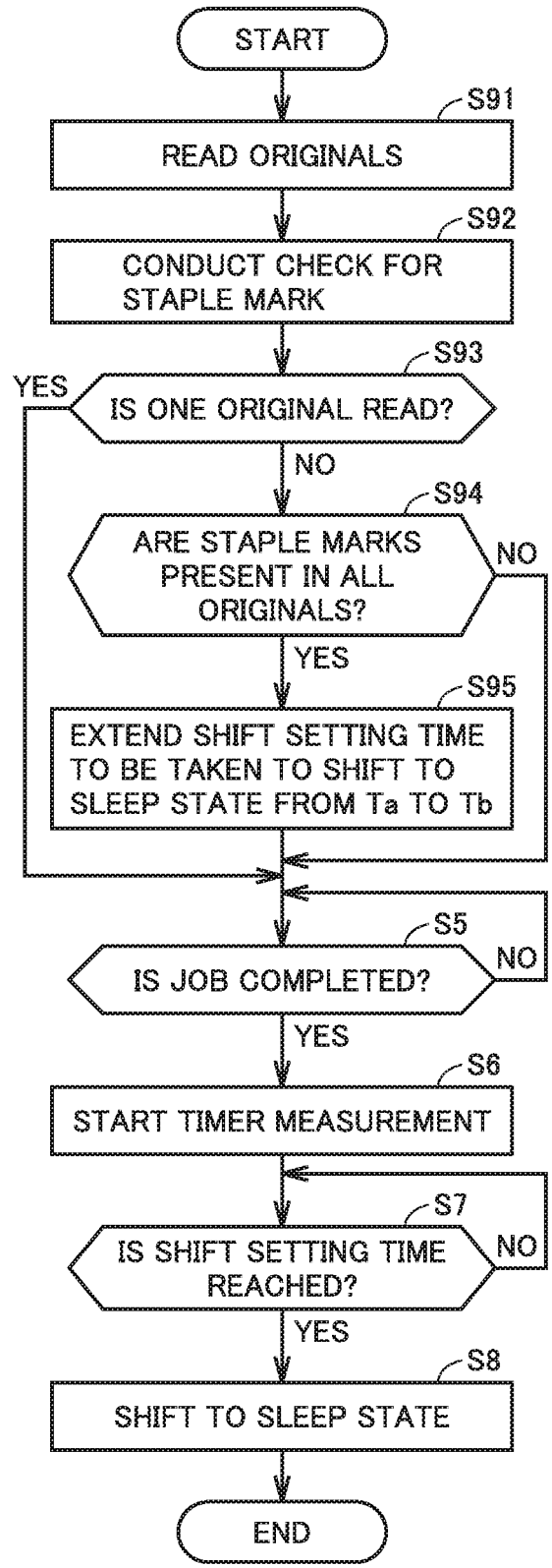
FIG. 16 is a flowchart for illustrating an overview of processing in a ninth variation.

FIG. 16 is a flowchart for illustrating an overview of processing in a ninth variation.

Referring to FIG. 16, in step S91, image forming apparatus 10 reads one or a plurality of originals. In step S92, controller 31 checks whether or not a staple mark is present in each read original.

In step S93, controller 31 determines whether or not one original is read. When one original is read (YES in step S93), controller 31 advances the processing to step S5. When a plurality of originals are read (NO in step S93), in step S94, controller 31 determines whether or not staple marks are present in all of the originals.

When controller 31 determines that staple marks are present in all of the originals (YES in step S94), in step S95, controller 31 extends the shift setting time to be taken until image forming apparatus 10 shifts to the sleep state, from default time Ta (predetermined time) to time Tb. When controller 31 does not determine that staple marks are present in all of the originals (NO in step S94), controller 31 advances the processing to step S5.

When one original is read, manual staple processing is less likely to be performed on the original. Therefore, power consumption can be reduced, as compared with a configuration in which the shift setting time is extended on condition that a staple mark is present when one original is read.

(f10. Tenth Variation)

Before describing a tenth variation, functions of threshold value setting unit 115 and time setting unit 116 will be described, with reference to FIG. 7 again.

Time setting unit 116 sets the value of a default value (that is, time Ta) of the shift setting time, based on a user operation through operation panel 34. That is, time setting unit 116 sets the default value of the shift setting time to a value in accordance with a user instruction. It should be noted that, since it is assumed that time Te (=Tb−Ta) has a constant value in the present example, a change in the value of time Ta also changes time Tb.

Threshold value setting unit 115 sets a threshold value Th related to time, based on a user operation through operation panel 34. Threshold value Th is used to determine necessity for extension of the shift setting time, as described later.

Figure 17:
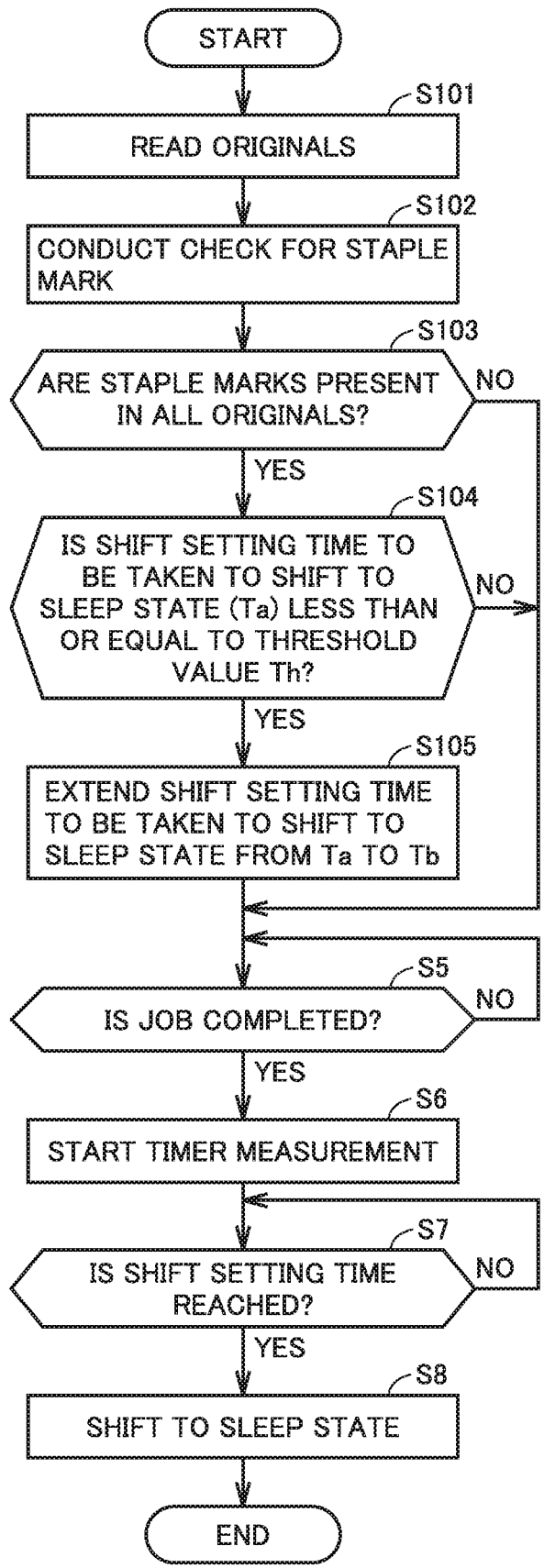
FIG. 17 is a flowchart for illustrating an overview of processing in a tenth variation.

FIG. 17 is a flowchart for illustrating an overview of processing in a tenth variation.

Referring to FIG. 17, in step S101, image forming apparatus 10 reads one or a plurality of originals. In step S102, controller 31 checks whether or not a staple mark is present in each read original.

In step S103, controller 31 determines whether or not staple marks are present in all of the originals. When controller 31 does not determine that staple marks are present in all of the originals (NO in step S103), controller 31 advances the processing to step S5.

When controller 31 determines that staple marks are present in all of the originals (YES in step S103), in step S104, controller 31 determines whether or not the shift setting time to be taken to shift to the sleep state (specifically, time Ta as the default value) is less than or equal to threshold value Th. When controller 31 determines that the shift setting time is longer than threshold value Th (NO in step S104), controller 31 advances the processing to step S5.

When controller 31 determines that the shift setting time is less than or equal to threshold value Th (YES in step S104), in step S105, the controller extends the shift setting time to be taken until image forming apparatus 10 shifts to the sleep state, from default time Ta to time Tb.

For example, when the user sets the default value of the shift setting time to a long time (for example, 30 minutes), it is often unnecessary to extend the shift setting time on condition that staple marks are present. That is, it is often unnecessary to extend the shift setting time to time Tb, which is longer than time Ta, even though time Ta is long enough.

Thus, power consumption can be reduced by adopting such a configuration that the shift setting time is extended only when the default value of the shift setting time is less than or equal to threshold value Th.

Figure 18:
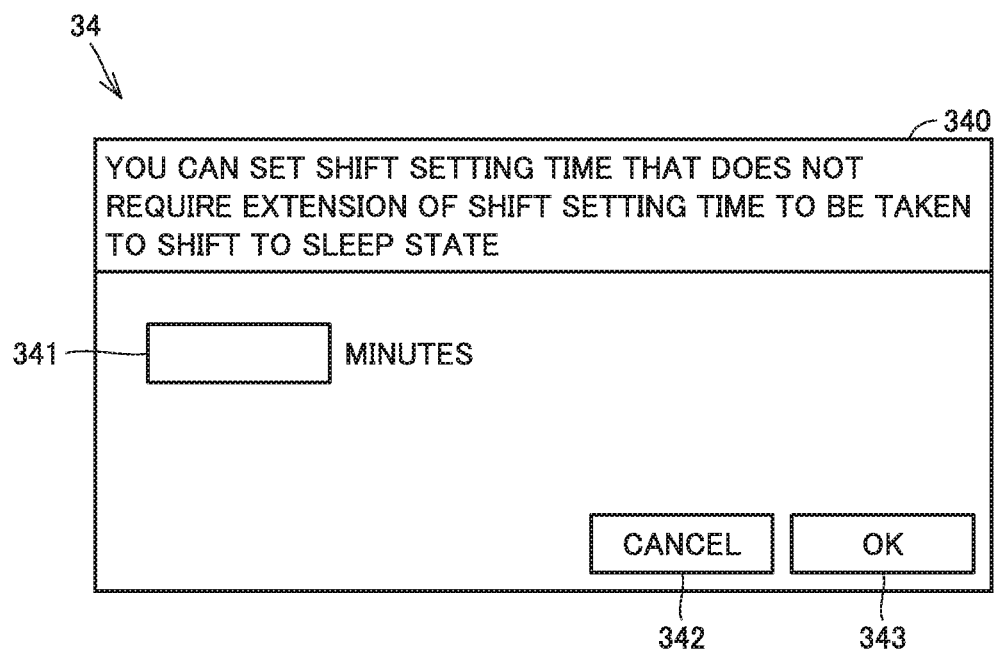
FIG. 18 is a view for illustrating a user interface for setting a threshold value.

FIG. 18 is a view for illustrating a user interface for setting threshold value Th.

Referring to FIG. 18, controller 31 causes operation panel 34 to display a screen 340, based on a predetermined user operation. Screen 340 includes an input box 341 for receiving an input of threshold value Th, a cancel button 342, and an OK button 343.

The user inputs a value of threshold value Th into input box 341, using software keys or physical keys on operation panel 34. Further, when the user selects OK button 343, the value input in input box 341 is set as threshold value Th.

(f11. Eleventh Variation)

Figure 19:
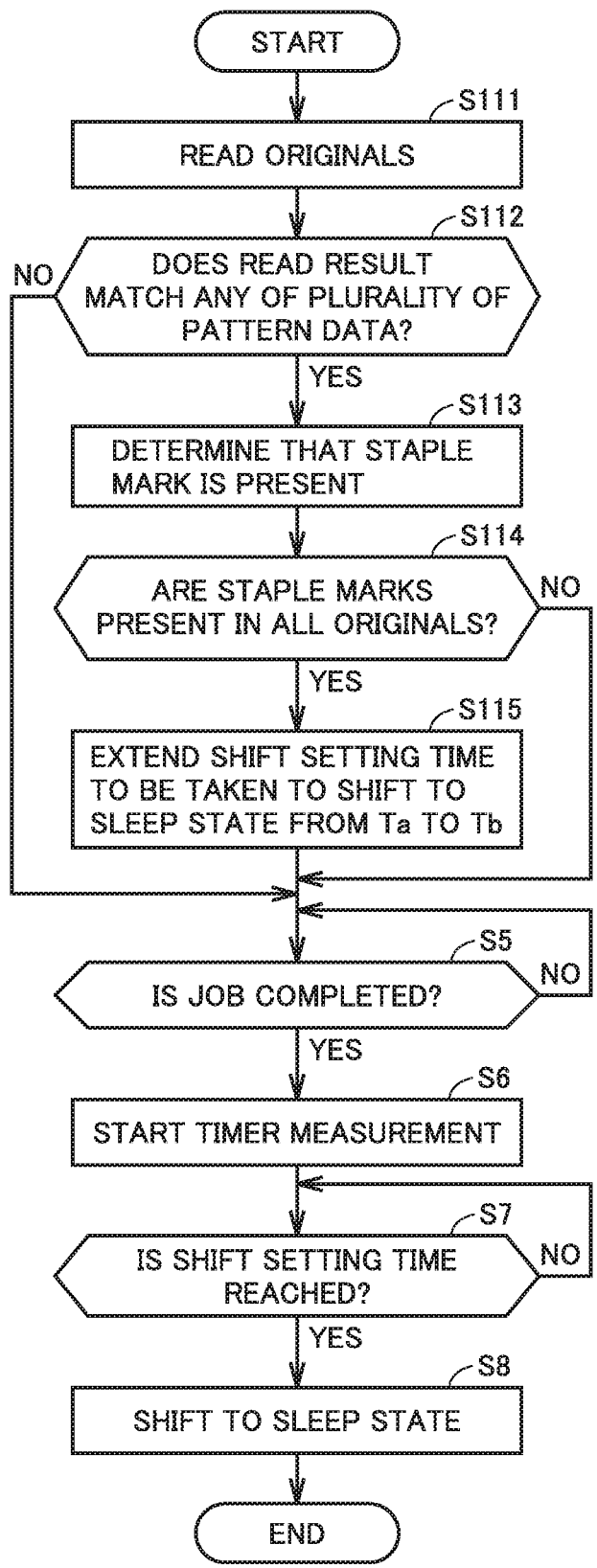
FIG. 19 is a flowchart for illustrating an overview of processing in an eleventh variation.

FIG. 19 is a flowchart for illustrating an overview of processing in an eleventh variation.

Referring to FIG. 19, in step S111, image forming apparatus 10 reads one or a plurality of originals. In step S112, controller 31 determines whether or not a read result (that is, image data) matches any of the plurality of pattern data (see FIG. 7) stored in storage unit 120. It should be noted that "match" includes not only a perfect match but also a match with a predetermined similarity or more.

When controller 31 determines that the read result matches the pattern data (YES in step S112), controller 31 determines that a staple mark is present (step S113). When controller 31 determines that the read result does not match the pattern data (NO in step S112), controller 31 advances the processing to step S5.

In step S114, controller 31 determines whether or not staple marks are present in all of the originals. When controller 31 determines that staple marks are present in all of the originals (YES in step S114), in step S115, controller 31 extends the shift setting time to be taken until image forming apparatus 10 shifts to the sleep state, from default time Ta to time Tb. When controller 31 does not determine that staple marks are present in all of the originals (NO in step S114), controller 31 advances the processing to step S5.

The pattern data are produced beforehand by an external apparatus based on data of staplers available in the market (for example, standards of needles), and are stored in image forming apparatus 10. For example, it is determined that the read result matches the pattern data on condition that the size of black dots (a staple mark) is within a specified range. It should be noted that it is not necessary to take the inclination of a virtual straight line that connects the black dots into consideration for determination.

Further, pattern data for needleless staplers may be produced, and the above determination may be performed utilizing the pattern data.

Although the above description has been given of an exemplary configuration in which the shift setting time is extended on condition that staple marks are present in all of the originals, the present disclosure is not limited thereto. For example, controller 31 may be configured to extend the shift setting time on condition that a staple mark is present in at least one original of the plurality of originals.

Further, the above description has been given of a configuration in which image forming apparatus 10 stores pattern data and the presence or absence of a staple mark is determined in image forming apparatus 10 using the pattern data. However, the present disclosure is not limited thereto.

For example, an external server may store pattern data, a read result (that is, image data) may be transmitted from image forming apparatus 10 to the external server, and the external server may determine the presence or absence of a staple mark. In this case, controller 31 has to receive a result of determination from the external server. Further, for example in the case of a configuration in which a check for the presence or absence of a staple mark is conducted on only the first original, image forming apparatus 10 only has to transmit a read result of the first original to the external server.

(f12. Twelfth Variation)

Figure 20:
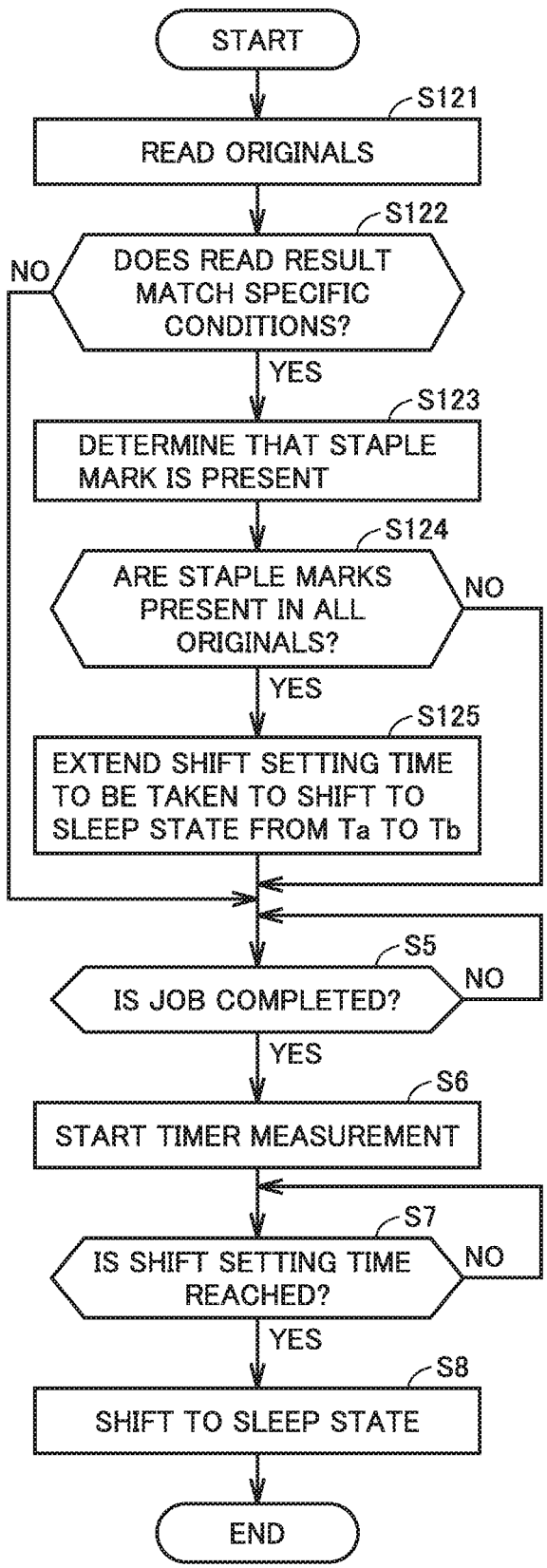
FIG. 20 is a flowchart for illustrating an overview of processing in a twelfth variation.

FIG. 20 is a flowchart for illustrating an overview of processing in a twelfth variation.

Referring to FIG. 20, in step S121, image forming apparatus 10 reads one or a plurality of originals. In step S122, controller 31 determines whether or not a read result (that is, image data) matches specific conditions. Typically, the "specific conditions" are conditions that two black dots are present at an end portion of an original including a corner area of the original, and the distance between the two black dots is within a predetermined range.

When controller 31 determines that the read result matches the specific conditions (YES in step S122), controller 31 determines that a staple mark is present (step S123). When controller 31 determines that the read result does not match the specific conditions (NO in step S122), controller 31 advances the processing to step S5.

In step S124, controller 31 determines whether or not staple marks are present in all of the originals. When controller 31 determines that staple marks are present in all of the originals (YES in step S124), in step S125, controller 31 extends the shift setting time to be taken until image forming apparatus 10 shifts to the sleep state, from default time Ta to time Tb. When controller 31 does not determine that staple marks are present in all of the originals (NO in step S124), controller 31 advances the processing to step S5.

Although the above description has been given of an exemplary configuration in which the shift setting time is extended on condition that staple marks are present in all of the originals, the present disclosure is not limited thereto. For example, controller 31 may be configured to extend the shift setting time on condition that a staple mark is present in at least one original of the plurality of originals.

Further, a network system may be constructed to allow the external server to determine whether or not the read result matches the specific conditions.

<G. Cancellation of Extension>

Next, a description will be given of processing of shifting image forming apparatus 10 to the sleep state after extending the shift setting time from time Ta to time Tb, without waiting for the lapse of time Tb.

Figure 21:
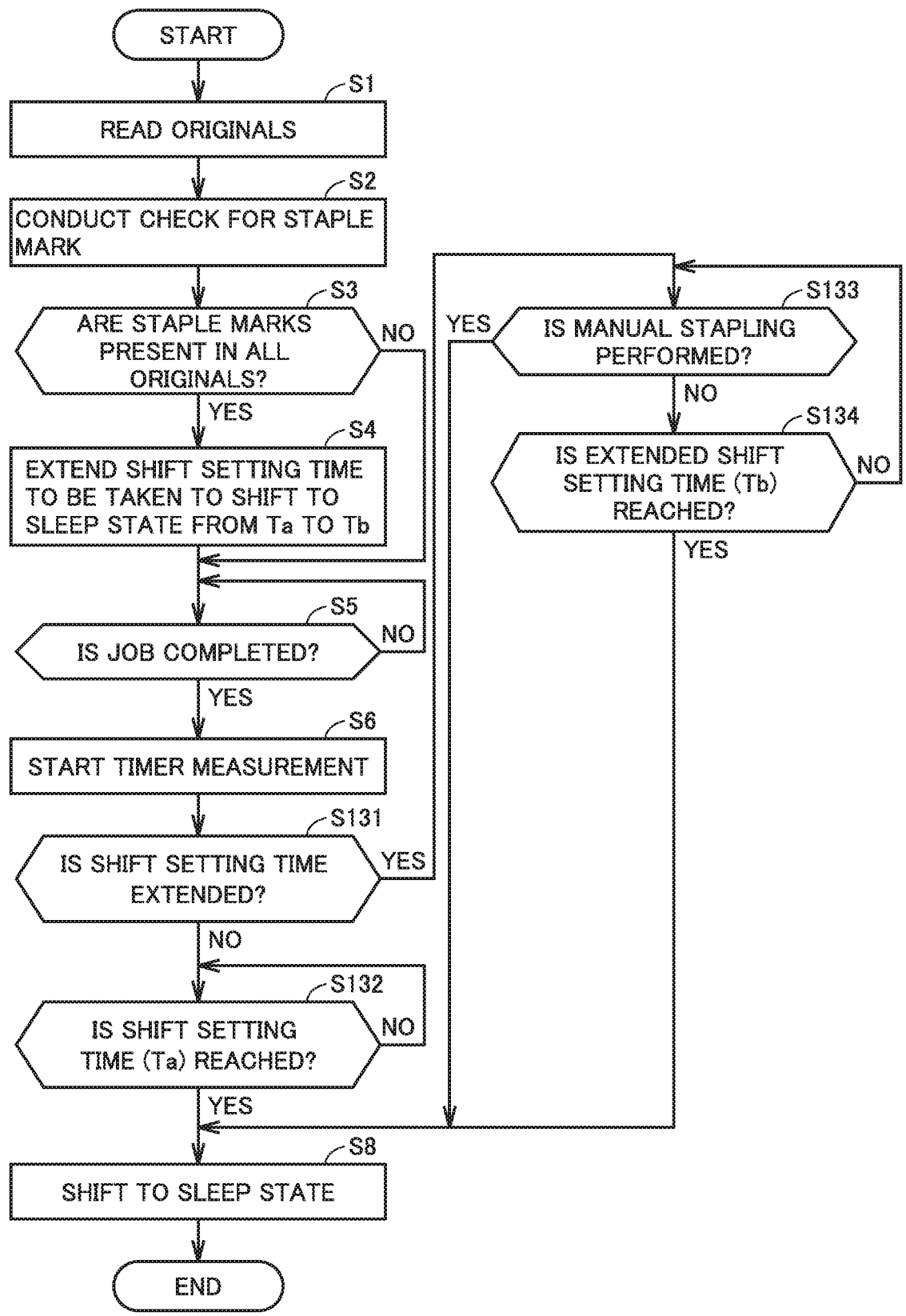
FIG. 21 is a flowchart for illustrating an overview of processing of the image forming system.

FIG. 21 is a flowchart for illustrating an overview of processing of image forming system 1000.

Referring to FIG. 21, the processings in steps S1 to S6 are performed, as in the case of FIG. 4. After step S6, in step S131, controller 31 determines whether or not the shift setting time is extended.

When controller 31 determines that the shift setting time is not extended (NO in step S131), in step S132, controller 31 determines whether or not the shift setting time (in this case, time Ta) is reached. When controller 31 determines that the shift setting time is reached (YES in step S132), in step S8, controller 31 shifts image forming apparatus 10 to the sleep state.

When controller 31 determines that the shift setting time is extended (YES in step S131), in step S133, controller 31 determines whether or not manual staple processing is performed. Typically, controller 31 recognizes that manual staple processing is performed, through a notification from post-processing apparatus 20.

When controller 31 does not determine that manual staple processing is performed (NO in step S133), in step S134, controller 31 determines whether or not the extended shift setting time (in this case, time Tb) is reached. When controller 31 determines that the shift setting time is reached (YES in step S134), in step S8, controller 31 shifts image forming apparatus 10 to the sleep state. When controller 31 determines that the shift setting time is not reached (NO in step S134), controller 31 returns the processing to step S133.

When controller 31 determines that manual staple processing is performed (YES in step S133), controller 31 advances the processing to step S8 and shifts image forming apparatus 10 to the sleep state.

As described above, by shifting image forming apparatus 10 to the sleep state based on the fact that manual staple processing is performed, power consumption can be reduced, as compared with a configuration of shifting image forming apparatus 10 to the sleep state after the lapse of the extended shift setting time (that is, time Tb).

<H. Variations of Trigger to Start Timer Measurement>

The above description has been given of an exemplary configuration in which timer measurement is started using completion of a job as a trigger, as shown for example in FIG. 4. However, the trigger to start timer measurement is not limited to completion of a job. In the following, three exemplary triggers other than completion of a job will be described.

Figure 22:
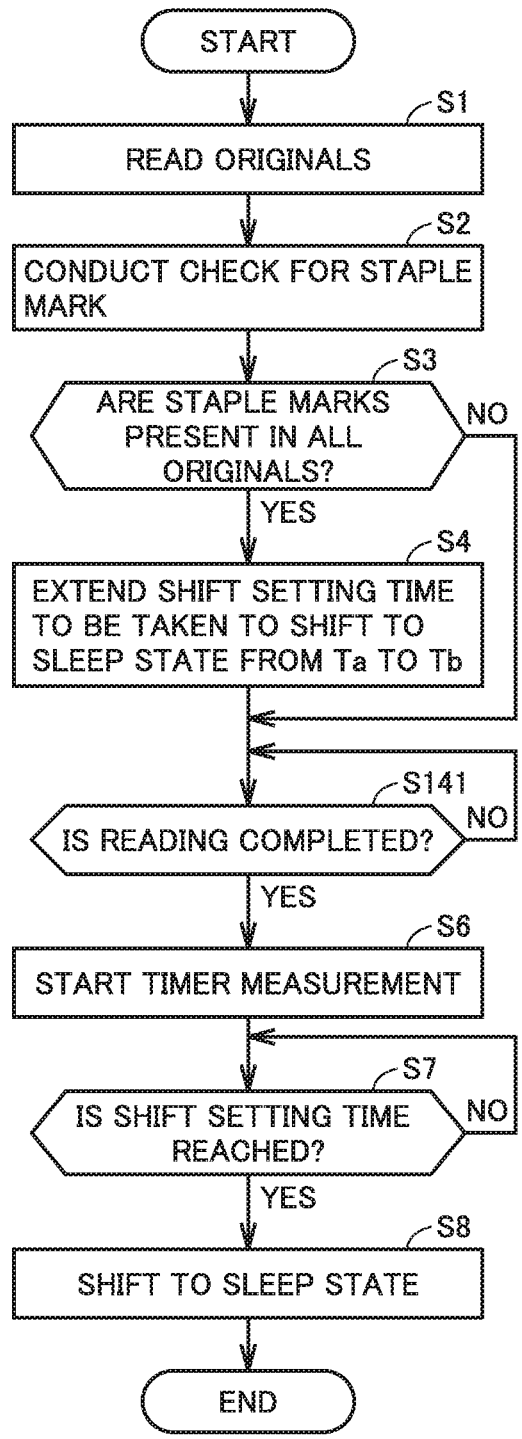
FIG. 22 is a flowchart for illustrating a flow of processing when completion of reading of the originals is used as a trigger to start timer measurement.

FIG. 22 is a flowchart for illustrating a flow of processing when completion of reading of the originals is used as a trigger to start timer measurement.

Referring to FIG. 22, the flowchart in FIG. 22 is different from the flowchart in FIG. 4 in that the former flowchart includes step S141 instead of step S5 (see FIG. 4). After step S4, in step S141, controller 31 determines whether or not reading of the originals is completed. When controller 31 determines that reading of the originals is completed (YES in step S141), controller 31 advances the processing to step S6 to start timer measurement. When controller 31 determines that reading of the originals is not completed (NO in step S141), controller 31 returns the processing to step S141.

Figure 23:
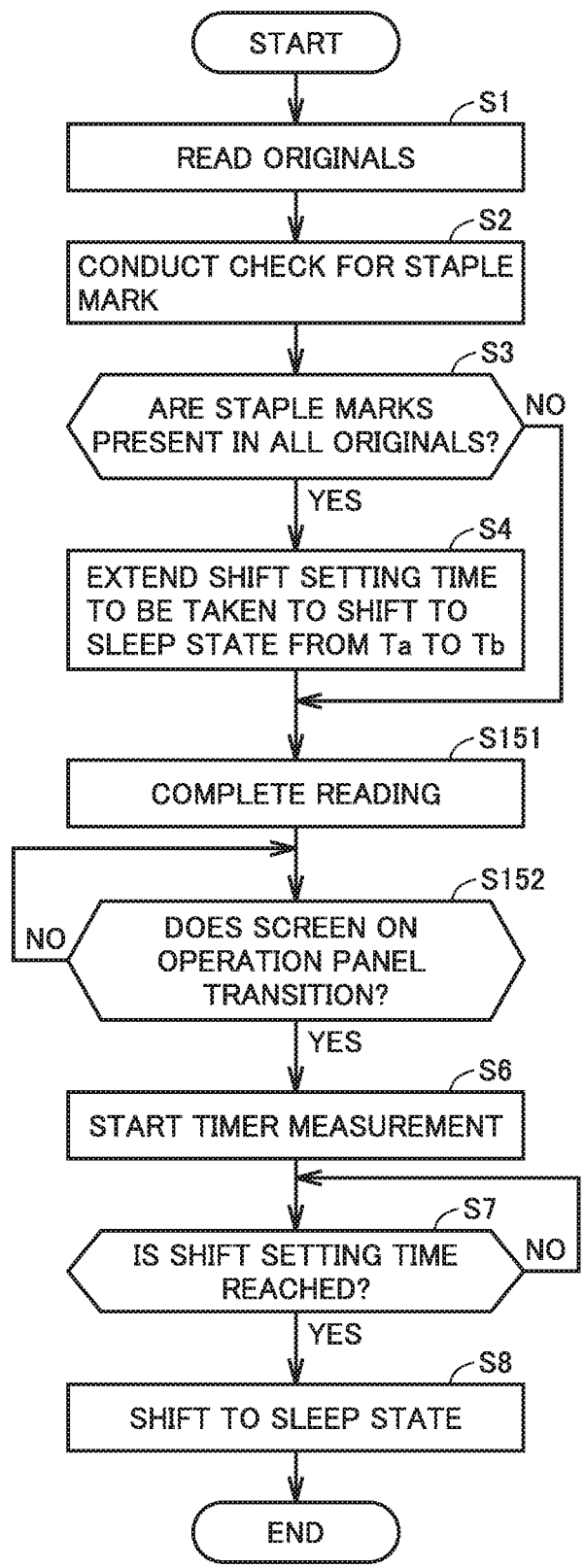
FIG. 23 is a flowchart for illustrating a flow of processing when screen transition in an operation panel is used as a trigger to start timer measurement.

FIG. 23 is a flowchart for illustrating a flow of processing when screen transition in operation panel 34 is used as a trigger to start timer measurement.

Referring to FIG. 23, the flowchart in FIG. 23 is different from the flowchart in FIG. 4 in that the former flowchart includes steps S151 and S152 instead of step S5 (see FIG. 4). After step S4, when reading of the originals is completed in step S151, in step S152, controller 31 determines whether or not the screen on operation panel 34 transitions. Specifically, controller 31 determines whether or not transition is made from a screen indicating that reading is performed to another screen.

When controller 31 determines that the screen transitions (YES in step S152), controller 31 advances the processing to step S6 to start timer measurement. When controller 31 does not determine that the screen transitions (NO in step S152), controller 31 returns the processing to step S152.

Figure 24:
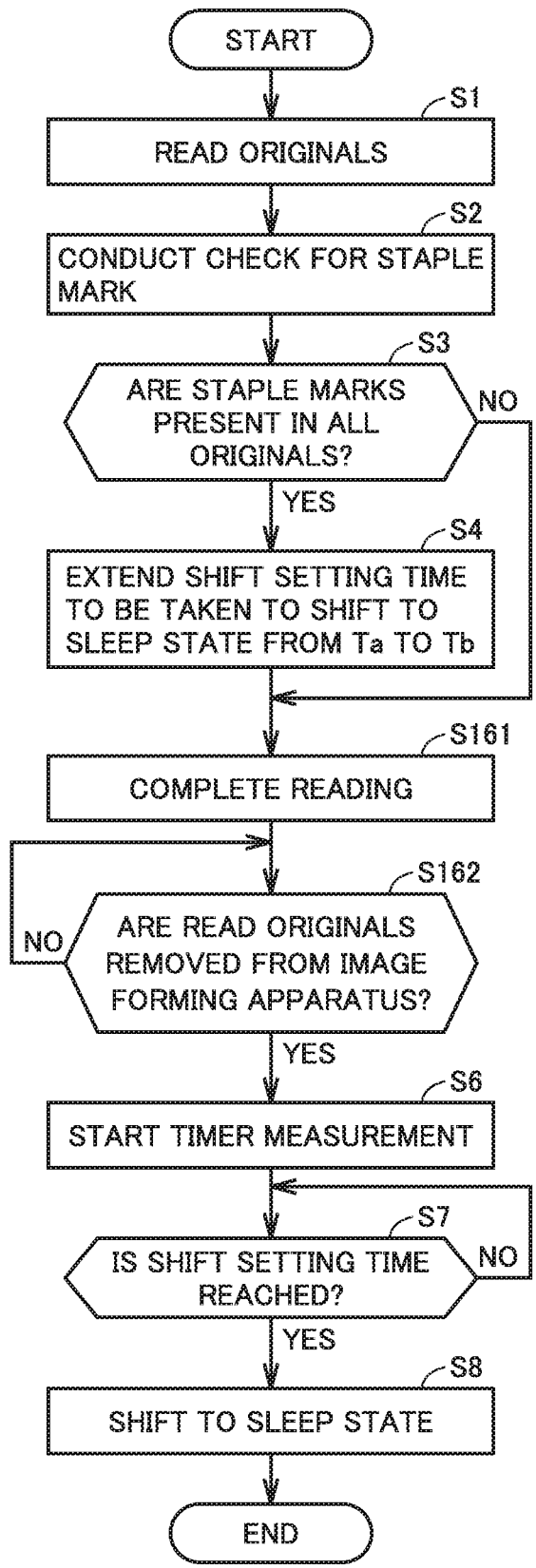
FIG. 24 is a flowchart for illustrating a flow of processing when removal of the originals from the image forming apparatus is used as a trigger to start timer measurement.

FIG. 24 is a flowchart for illustrating a flow of processing when removal of the originals from image forming apparatus 10 is used as a trigger to start timer measurement.

Referring to FIG. 24, the flowchart in FIG. 24 is different from the flowchart in FIG. 4 in that the former flowchart includes steps S161 and S162 instead of step S5 (see FIG. 4). After step S4, when reading of the originals is completed in step S161, in step S162, controller 31 determines whether or not the read originals are removed from image forming apparatus 10. Specifically, controller 31 determines whether or not the originals are removed from tray 133 (see FIG. 1) of automatic original feeding device 13, or a platen of image forming apparatus 10, based on a sensor output.

When controller 31 determines that the originals are removed (YES in step S162), controller 31 advances the processing to step S6 to start timer measurement. When controller 31 does not determine that the originals are removed (NO in step S162), controller 31 returns the processing to step S162.

In the first to twelfth variations, the trigger to start timer measurement may be changed to completion of reading of the originals, screen transition in operation panel 34, or removal of the originals from image forming apparatus 10, as described above. Further, also in the flowchart shown in FIG. 21, the trigger to start timer measurement may be changed to completion of reading of the originals, screen transition in operation panel 34, or removal of the originals from image forming apparatus 10, as described above.

It should be noted that completion of reading of the originals, screen transition in operation panel 34, and removal of the originals from image forming apparatus 10 are examples of the "reference timing", as with completion of a job.

Although embodiments of the present disclosure have been described and illustrated in detail, the disclosed embodiments are made for purposes of illustration and example only and not limitation. The scope of the present disclosure should be interpreted by terms of the appended claims.

What is claimed is:

1. An image forming system comprising:
    an image forming apparatus having an image reading device; and
    a post-processing apparatus having a manual staple mechanism, the manual staple mechanism being capable of performing staple processing on condition that power is supplied from the image forming apparatus to the post-processing apparatus,
    wherein:
    the image forming apparatus stops power supply to the post-processing apparatus on condition that a predetermined time has elapsed since a reference timing,
    when the image forming apparatus reads an original with the image reading device, the image forming apparatus determines presence or absence of a staple mark in the original based on a read result,
    when a plurality of originals are continuously read with the image reading device, the image forming apparatus performs a determination of whether or not the staple mark is present, on only a first original of the plurality of originals, and
    when the image forming apparatus determines that the staple mark is present, the image forming apparatus extends the predetermined time.

2. The image forming system according to claim 1, wherein, when the predetermined time has elapsed since the reference timing, the image forming apparatus stops power supply to the post-processing apparatus by shifting a state of the image forming apparatus from a standby state to a sleep state.

3. The image forming system according to claim 1, wherein:
    the image forming apparatus reads a front side and a back side of the original with the image reading device, and
    the image forming apparatus extends the predetermined time on condition that the staple mark is present on at least one of the front side and the back side.

4. The image forming system according to claim 1, wherein:
    the image forming apparatus reads a front side and a back side of the original with the image reading device, and
    the image forming apparatus extends the predetermined time on conditions that staple marks are present on the front side and the back side, and a position of the staple mark on the front side and a position of the staple mark on the back side have a corresponding positional relation.

5. The image forming system according to claim 1, wherein:
    the image forming apparatus can set a reading resolution to be used when reading the plurality of originals, and
    the image forming apparatus reads only the first original from among the plurality of originals with a reading resolution higher than the set reading resolution.

6. The image forming system according to claim 5, wherein the image forming apparatus reads the first original with a maximum reading resolution of the image forming apparatus.

7. The image forming system according to claim 1, wherein:
    the image forming apparatus has an automatic original feeding device, and
    when a setting that causes the automatic original feeding device to read a plurality of originals in a plurality of reading batches is selected, the image forming apparatus determines the presence or absence of the staple mark in each of the reading batches.

8. The image forming system according to claim 7, wherein, when the image forming apparatus determines that the staple mark is present in at least one reading batch from among the plurality of reading batches, the image forming apparatus extends the predetermined time.

9. The image forming system according to claim 1, wherein, when only one original is read with the image reading device, the image forming apparatus does not extend the predetermined time, even though the image forming apparatus determines that the staple mark is present in the original.

10. The image forming system according to claim 1, wherein:
   the image forming apparatus receives an input for setting the predetermined time, and
   when the predetermined time is longer than a predetermined threshold value, the image forming apparatus does not extend the predetermined time, even though the image forming apparatus determines that the staple mark is present.

11. The image forming system according to claim 10, wherein the image forming apparatus further receives an input for setting the threshold value.

12. The image forming system according to claim 1, wherein:
   the image forming apparatus stores a plurality of items of data that are each used to determine the presence or absence of the staple mark, and
   the image forming apparatus determines the presence or absence of the staple mark on condition that the read result matches or is similar to at least one of the plurality of items of data.

13. The image forming system according to claim 1, wherein the image forming apparatus determines that the staple mark is present based on the read result, on conditions that two black dots are present at an end portion of the original including a corner area of the original, and a distance between the two black dots is within a predetermined range.

14. The image forming system according to claim 1, wherein the reference timing is a timing at which a job ends.

15. The image forming system according to claim 1, wherein:
   the image forming apparatus further has an operation panel capable of displaying an operation situation of the image forming apparatus, and
   the reference timing is a timing at which display performed by the operation panel shifts from an image indicating that reading of the original is performed to another image.

16. The image forming system according to claim 1, wherein:
   the image forming apparatus detects whether or not the read original is present on a platen glass or in an ejection tray of an automatic original feeding device, and
   the reference timing is a timing at which the image forming apparatus detects that the read original is not present on the platen glass or in the ejection tray of the automatic original feeding device.

17. The image forming system according to claim 1, wherein:
   when the image forming apparatus determines that the staple mark is present, the image forming apparatus extends the predetermined time from a first time to a second time longer than the first time, and
   when the predetermined time is extended, and manual stapling is performed using the manual staple mechanism after a lapse of the first time and before a lapse of the second time, the image forming apparatus stops power supply to the post-processing apparatus without waiting for the lapse of the second time.

18. An image forming system comprising:
   an image forming apparatus having an image reading device; and
   a post-processing apparatus having a manual staple mechanism, the manual staple mechanism being capable of performing staple processing on condition that power is supplied from the image forming apparatus to the post-processing apparatus,
   wherein:
   the image forming apparatus stops power supply to the post-processing apparatus on condition that a predetermined time has elapsed since a reference timing,
   when the image forming apparatus reads an original with the image reading device, the image forming apparatus determines presence or absence of a staple mark in the original based on a read result,
   when the image forming apparatus determines that the staple mark is present, the image forming apparatus extends the predetermined time, and
   the reference timing is a timing at which reading of the original ends.

19. A method for controlling power supply from an image forming apparatus to a post-processing apparatus having a manual staple mechanism, the manual staple mechanism being capable of performing staple processing on condition that power is supplied from the image forming apparatus to the post-processing apparatus, and the method comprising:
   stopping, by the image forming apparatus, power supply to the post-processing apparatus on condition that a predetermined time has elapsed since a reference timing;
   when the image forming apparatus reads an original, determining, by the image forming apparatus, presence or absence of a staple mark in the original based on a read result;
   when a plurality of originals are continuously read by the image forming apparatus, performing, by the image forming apparatus, a determination of whether or not the staple mark is present, on only a first original of the plurality of originals; and
   when the image forming apparatus determines that the staple mark is present, extending, by the image forming apparatus, the predetermined time.

20. A non-transitory computer-readable recording medium storing a program for controlling an image forming apparatus that supplies power to a post-processing apparatus having a manual staple mechanism, the manual staple mechanism being capable of performing staple processing on condition that power is supplied from the image forming apparatus to the post-processing apparatus, and the program being executable by a processor of the image forming apparatus to cause the processor to:
   stop power supply to the post-processing apparatus on condition that a predetermined time has elapsed since a reference timing;
   when an original is read by the image forming apparatus, determine presence or absence of a staple mark in the original based on a read result;
   when a plurality of originals are continuously read by the image forming apparatus, perform a determination of whether or not the staple mark is present, on only a first original of the plurality of originals; and
   when it is determined that the staple mark is present, extend the predetermined time.

* * * * *